United States Patent
Cariou et al.

(10) Patent No.: US 10,230,654 B2
(45) Date of Patent: Mar. 12, 2019

(54) MULTIBAND AGGREGATION DATA ENCAPSULATION

(71) Applicant: Intel IP Corporation, Santa Clara, CA (US)

(72) Inventors: Laurent Cariou, Portland, OR (US); Yaron Alpert, Petah Tikva (IL); Bahareh Sadeghi, Portland, OR (US); Carlos Cordeiro, Portland, OR (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 245 days.

(21) Appl. No.: 15/392,575

(22) Filed: Dec. 28, 2016

(65) Prior Publication Data

US 2018/0183723 A1    Jun. 28, 2018

(51) Int. Cl.
| | | |
|---|---|---|
| *H04L 29/06* | (2006.01) | |
| *H04L 29/08* | (2006.01) | |
| *H04W 40/02* | (2009.01) | |
| *H04W 88/10* | (2009.01) | |
| *H04L 12/801* | (2013.01) | |
| *H04L 12/851* | (2013.01) | |
| *H04L 12/863* | (2013.01) | |

(52) U.S. Cl.
CPC ........ *H04L 47/624* (2013.01); *H04L 47/2483* (2013.01); *H04L 47/34* (2013.01); *H04L 69/22* (2013.01); *H04W 40/02* (2013.01); *H04L 69/324* (2013.01); *H04W 88/10* (2013.01)

(58) Field of Classification Search
CPC ... H04L 47/624; H04L 47/34; H04L 47/2483; H04L 69/22; H04L 69/324; H04W 40/02; H04W 88/10
See application file for complete search history.

*Primary Examiner* — Walter J DiVito
(74) *Attorney, Agent, or Firm* — Eversheds Sutherland (US) LLP

(57) ABSTRACT

A device is disclosed that may identify a frame received from an access point. The device may cause to buffer the payload field. The device may determine that a first payload, in a first payload field, corresponds to a multiband link aggregation (MBLA) Ethertype based at least in part on a logical link layer controller (LLC) field and a subnetwork access protocol (SNAP) Ethertype MBLA field in the first payload, wherein the first payload is within the payload field. The device may cause to remove a LLC MBLA header field from the first payload field. The device may cause to buffer a packet in a reordering queue, wherein the packet is in a second payload field that is in the first payload field. The device may order the packet among a plurality of packets in the reordering queue.

20 Claims, 24 Drawing Sheets

MULTIBAND AGGREGATION DATA ENCAPSULATION

TECHNICAL FIELD

This disclosure generally relates to systems and methods for wireless communications and, more particularly, to multiband aggregation.

BACKGROUND

Wireless devices, such as mobile phones, personal data assistants, laptops, desktop computers, and access points that connect these wireless devices to the internet may operate on different frequencies. As a result some wireless devices may be prevented from connecting to certain access points if the wireless devices do not comprise hardware that will enable the wireless devices to operate at the same frequency at which the access points are operating at. New hardware, firmware, middleware, frequency aggregation, and data encapsulation techniques must be implemented in order to enable wireless devices to connect to access points operating on different frequencies.

DETAILED DESCRIPTION

Figure 1:
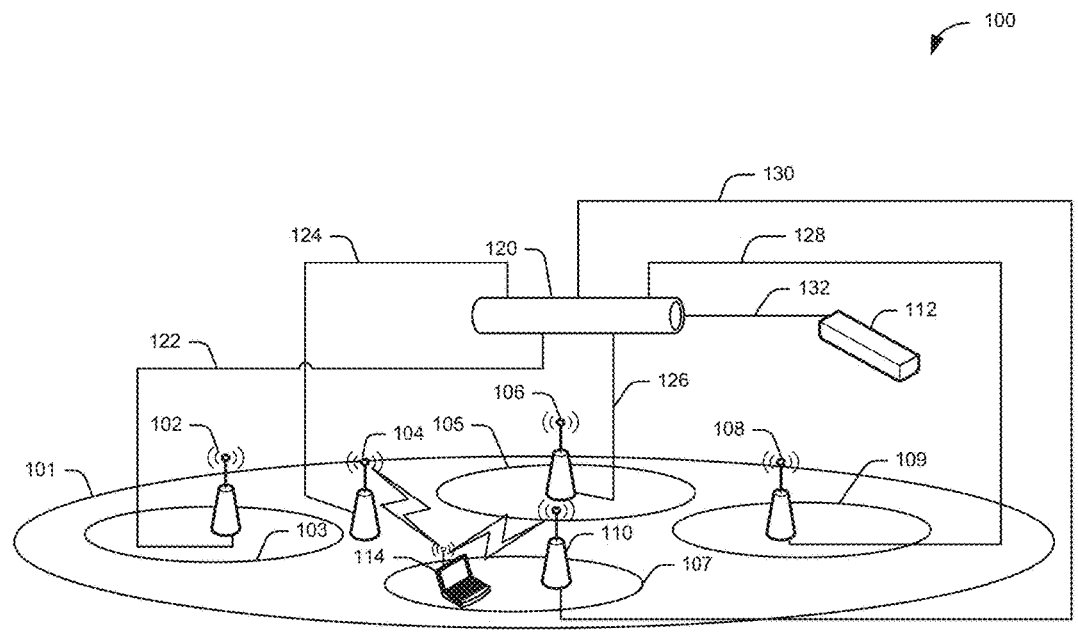
FIG. 1 depicts a network diagram illustrating an example network environment, according to one or more example embodiments of the disclosure.

Example embodiments described herein provide certain systems, methods, and devices, for establishing a spatial reuse channel between to wireless devices.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

For next generation WiFi (e.g., IEEE 802.1 lax wave 2) a very compelling technical improvement can be provided by the definition of link aggregation between different WiFi air interfaces associated with different frequency bands (e.g., 2.4 GHz, 5 GHz, or 60 GHz). For example, a first access point (AP) may comprise a first radio comprising a first air interface that operates at a first frequency (e.g., 5 GHz) and a second AP may comprise a second radio comprising a second air interface that operates at a second frequency (e.g., 60 GHz), and the first AP may transmit and receive packets to and from a wireless client comprising a first mobile radio, comprising a first mobile air interface, operating at the first frequency (e.g., 5 GHz) and the second AP may transmit and receive packets to and from a second mobile radio, comprising a second mobile air interface, operating at the second frequency (e.g., 60 GHz). A multi-band proxy may determine to transmit a first set of the packets (a first traffic flow) on the first air interface and may determine to transmit a second set of packets (a second traffic flow) on the second air interface, simultaneously. This may be referred to as simultaneous dual band operation.

Simultaneous dual band operation at 2.4 and 5 GHz may be used in certain APs currently, and tri-band APs may be available soon. Link aggregation can also be applicable to multiple air interfaces in the same band. For example, the first and second radios may comprise an IEEE 802.11ac or IEEE 802.11ax air interface, both of which operate at 5 GHz on two different channels each of which have a bandwidth of 80 MHz.

The techniques proposed herein provide a solution by which significantly higher throughput or higher reliability can be achieved if two wireless clients or a wireless client and the AP support simultaneous multi-band operation. Link aggregation may be implemented in hardware or firmware corresponding to a media access control (MAC) layer of the wireless client and AP, by establishing at least a first link between the first mobile radio in the wireless client and the first radio in the first AP and at least a second link between the second mobile radio in the wireless client and the second AP on different bands with different air interfaces, operating independently from each other. The at least two wireless links can be aggregated, for instance in a multi-band upper MAC defined in each of the peer wireless clients. For example, a fast session transfer (FST) entity, as defined below, may be used to implement link aggregation.

Link aggregation enables APs to distribute traffic flows on multiple bands/air interfaces in order to sum the throughputs from the different air interfaces, and direct a specific traffic type on the best air interface (e.g., highest throughput interface, most reliable interface, or lower latency interface, etc.). Link aggregation may be implemented in such a way that it is transparent to other layers operating above the MAC layer (higher layers), but may the operations performed by the MAC layer to implemented link aggregation may be accessible to the higher layers. The higher layers (e.g., network layer, transport layer, session layer, presentation layer, and application layer) may access the MAC layer via a media access control service access point (MAC SAP). For example, and as explained below, a network layer in the wireless client may encapsulate an internet protocol (IP) packet in a new packet or datagram called a multi-band link aggregation (MBLA) packet or datagram, and may forward the MBLA packet or datagram to the MAC via the MAC SAP using a service primitive that may be provided by the MAC SAP to the network layer to forward MBLA packets or datagrams to the MAC layer. It should be noted that since the MBLA packet or datagram is a new packet/datagram, the service primitive provided by MAC SAP to forward MBLA packets or datagrams to the MAC may be a new service primitive as well. In some embodiments, the service primitives in IEEE 802.11 ad may be used, by the network layer, to forward MBLA packets or datagrams to the MAC layer.

A multi-band upper-MAC (UMAC) layer, comprising one or more hardware and/or firmware components, may be used to implement link aggregation in the wireless client side and on AP. A multi-band upper-layer, also known as a multi-band proxy, can be non-collocated or collocated with one or multiple APs. The multi-band proxy may be collocated with the first AP, and two wireless links can be aggregated by the muli-band proxy, wherein a first link is established between the first AP and the first mobile radio of the wireless client and a second link is established between the second AP and the second mobile radio. The first AP may be referred to as an anchor AP and the second AP may be referred to as a booster AP.

Link aggregation may be implemented by developing, or defining, air interfaces for the radio in the AP and radios in the wireless client and an encapsulation protocol for the multi-band proxy to transmit and receive packets to and from the wireless client through the booster AP or anchor AP. In addition to this, because packets may be transmitted between the wireless client and multi-band proxy through the booster AP and anchor AP the multi-band proxy must have a way of keeping track of the order of packets transmitted by the wireless client to the multi-band proxy as some of the packets may be received from the wireless client via the booster AP and some of the packets may be received from the anchor AP. Accordingly, the multi-band proxy has to reorder packets received from the wireless client when they are received out of order. In some embodiments, the multi-band layer 2 (L2) routing and signaling protocol (e.g., a routing and signaling protocol implemented over Ethernet) may be used to ensure packets are properly routed to the multi-band proxy, and reordered by the multi-band proxy, before they are forwarded to their intended destination via the Internet. The packets may be encapsulated in a media access control protocol data unit (MPDU) wherein the header of the MPDU includes a new Ethernet format.

The methods disclosed herein for link aggregation may be executed by the multi-band proxy to aggregate two or more wireless links wherein each of the two or more wireless links may include an uplink and/or downlink and each of the two or more wireless links may correspond to connections between two or more APs and a wireless client. The two or more APs may be collocated or non-collocated, and the mult-band proxy may reorganize packets received from the wireless client, through the two or more APs, using the new Ethernet format for the MPDU.

The signaling protocol described herein may be executed by the wireless client, when transmitting packets to the multi-band proxy, in order to ensure that the frames encapsulating the packets transmitted on different wireless links are properly reordered when they are received by the multi-band proxy. In particular, a multi-band sequence number (MBSN) may be included in the new Ethernet format that may be used by the multi-band proxy to reorder the frames when they are received from the wireless client.

The multi-band L2 routing and signaling protocol may enable the wireless client to send a MBSN number along with the data in a traffic flow to the multi-band proxy, in order to enable reordering of the frames, by the multi-band proxy, when they are received via multiple links at different times. The multi-band L2 routing and signaling may also enable the wireless client to send a traffic identifier (TID) number along with the data in the traffic flow, so that the multi-band proxy can identify the traffic flow, when it receives packets on the multiple links, and perform specific treatment (e.g., traffic steering on a given link). In some embodiments, a single traffic flow may be assigned to a single link. In other embodiments, multiple traffic flows may be assigned to a given link. For example, a first link may be established between an anchor AP and a first wireless radio in a wireless client, wherein the first link corresponds to a 5 GHz link, and there may be a first traffic flow over the first link and a second traffic flow over the first link. There may be a first TID number and second TID number associated with the first traffic flow and the second traffic flow, respectively. The first flow may correspond to a first application executing on the wireless client requiring a first Quality of Service (QoS) (e.g., e-mail application requiring a reliable connection with a lower throughput), and the second flow may correspond to a second application executing on the wireless client requiring the first QoS (e.g., a web browser application). When the wireless client (e.g., UMAC link aggregation-fast session transfer (LA-FST) entity in the wireless client) transmits packets to the multi-band proxy (e.g., UMAC link aggregation-fast session transfer (LA-FST) entity in the multi-band proxy) the wireless client may include the first TID in the frames carrying packets associated with the first application so that the multi-band proxy can identify the packets associated with the first application and the wireless client may include the second TID in the frames carrying packets associated with the second application so that the multi-band proxy can identify the packets associated with the second application. A second link may be established between the booster AP and the second wireless radio in the wireless client, wherein the second link may correspond to a 60 GHz link and there may a third traffic flow over the second link. There may be a third TID number associated with the third traffic flow, and the third flow may correspond to a third application executing on the wireless client requiring a second QoS (e.g., a mobile voice over internet protocol (VoIP) application such as WhatsApp™). When the UMAC LA-FST entity in the wireless client transmits packets to the UMAC LA-FST entity in the multi-band proxy, the UMAC LA-FST entity in the wireless client may include a third TID in the frames carrying the packets associated with the third application so that the UMAC LA-FST entity in the multi-band proxy can identify the packets associated with the third application. The UMAC LA-FST entity in the multi-band proxy may use the TID numbers to identify the different traffic flows. Accordingly, the UMAC LA-FST entity in the multi-band proxy may determine that the first link is used for the first and second traffic flows and the corresponding TID numbers for the first and second traffic flows are the first TID number and the second TID number, respectively, and the second link is used for the third traffic flow and is identified by the third TID number. The UMAC LA-FST entity in the multi-band proxy may therefore identify a link based on the TID number.

The multi-band proxy and wireless client may implement a stateless or non-stateless link aggregation method. The stateless link aggregation method comprises a multi-band L2 routing and signaling protocol in which packets transmitted between the wireless client and the multi-band proxy comprise a field including an address of the multi-band receiver (e.g., multi-band proxy or wireless client), so that an AP, either the anchor AP or booster AP, can forward the packets to the multi-band receiver without having to use a lookup or forwarding table associated with the wireless client. The non-stateless link aggregation method comprises a multi-band L2 routing and signaling protocol in which packets transmitted between the wireless client and the multi-band proxy do not comprise a field including an address of the multi-band receiver. As a result, the AP may use a lookup or forwarding to table associated with the wireless client to forward the frames comprising the packets to the multi-band receiver. The lookup or forwarding table associated with the wireless client may be a table stored in the AP, and in particular, implemented in firmware stored in an UMAC of the AP, that may look up a MAC address associated with the wireless client if a frame comprising a packet destined for the wireless client is received from the multi-band proxy and/or vice versa. In some embodiments, the AP may store a routing table in addition to the forwarding table, and may route the packets to the wireless client or multi-band proxy and/or vice versa, instead of forwarding the frames comprising the packets. In some embodiments, the stateless link aggregation method may be backward compatible with some existing (legacy) wireless clients implementing older versions of the IEEE 802.11 standard. In other embodiments, the non-stateless link aggregation method may be implemented by the legacy wireless client by storing and executing firmware and/or software corresponding to the non-stateless link aggregation method disclosed herein.

FIG. 1 illustrating an example network environment, according to some example embodiments of the present disclosure. The network may include APs connected to a controller, wherein the controller may be an anchor point that routes frames received from one or more wireless devices to the Internet. For instance, a wireless device may comprise a first wireless radio operating at a first frequency (e.g., 5 GHz) and a second wireless radio operating at a second frequency (e.g., 60 GHz) each of which may connect to a first access point operating at the first frequency and a second access point second frequency respectively. A multi-band proxy may be collocated with the first or second access point, or may not be collocated with either access point, and may receive frames from the first access point or second access point via a Ethernet connection wherein the frames may correspond to frames generated by the first wireless radio or the second wireless radio. For instance, the wireless device, an UMAC of the wireless device may generate a first traffic stream that may be transmitted on the first wireless radio and a second traffic stream that may be transmitted on the second wireless radio, wherein the first traffic stream may be transmitted to the first access point and the second traffic stream may be transmitted the second access point. The first and second access points may transmit Ethernet frames associated with the first and second traffic streams to the multi-band proxy, which may convert the Ethernet frames into another Ethernet frame format that may be used by the anchor point to route the frames to their intended destination. Network 100 may comprise at least one first access point operating at a first frequency (e.g., 60 GHz access point) and at least one second access point operating at a second frequency (e.g., 5 GHz access point) that may be connected to the Internet via a controller. In some embodiments, the at least one first access point and the at least one second access point may be collocated and in other embodiments they may not be collocated. The at least one first access point and the at least one second access point may not be collocated. There may be user devices connected to the at least one first access point and the at least one second access point, and the user devices connected to the at least one first access point may be comprise a first basic service set (BSS) and the user devices connected to the at least one second access point may comprise a second basic service set (BSS). The controller may manage the configuration of the at least one first access point and the at least one second access point including determining settings for the at the at least one first access point and the at least one second access point to reduce interference that the at least one first access point and the at least one second point may be causing to other wireless devices within their vicinity. For example, the controller may determine based on reports generated by the at least one first and second access points that the power levels should be adjusted to better accommodate the user devices (e.g., increase power to cover a larger area thereby providing access to more users). The controller may also determine, based on the reports, different channel assignments that may be used by the user devices to connect to the at least one first and second access points. The controller may also manage the configuration of the at least one first access point and the at least one second access point by determining settings that govern the amount of data that the at least one first access point and the at least one second access point can send to and/or receive from the Internet (e.g., load balancing). For example, the controller may enable the at least one first and second access points to enable high-speed load balancing which may enable an user device to connect to multiple access points at the same time for better coverage and data rates. In order to do this though, the user device may need to be authenticated by the controller, via the access points, using an authentication, authorization, and accounting (AAA) protocol such as IEEE 802.1X, as explained below.

Access points 102, 106, 110, and 108 may all operate at a first frequency and may form four BSSs each of which is associated with user devices within footprints 103, 105, 107, and 109 respectively. Footprints 103, 105, 107, and 109 are areas of electromagnetic radiation corresponding to radio frequency (RF) signals that may be sent by the access points to the user devices in the corresponding BSSs, and RF signals sent from the user devices to the access points in the corresponding BSSs. Access point 104 may operate a second frequency, that may be different from the first frequency, and may have corresponding footprint 101. Footprint 101 may be an area of electromagnetic radiation corresponding to RF signals that may be sent by access point 104 to user devices within the BSS associated with footprint 101, and RF signals sent from the user devices to access point 104. Access points 102, 104, 106, 108, and 110 may be connected to controller 112 by wired connections 122, 124, 126, 128, and 130 respectively, and backhaul network 120. Controller 112 may possess one or more of the controller characteristics and or perform one or more of the controller actions described above. In some embodiments, controller 112 may be an authentication server (AS), and may be responsible for authenticating access point s102, 104, 106, 108, and 10 using the 802.1x authentication protocol. Backhaul network 120 may be a network connecting access points 102, 104, 106, 108, and 110 to each other and controller 112. Wired connections 122, 124, 126, 128, and 130 may be an Ethernet connection. User device 114 may be a mobile device such as a laptop and may be moved from one BSS to another as a user moves from one location to another. User device 114 may comprise a first radio configured to connect to access point 104 on a 5 GHz frequency, and may also comprise a second radio configured to connect to access point 110 on a 60 GHz frequency. In some embodiments, information associated with a data plane may be sent and received using the first radio and information associated with a management plane may be sent or received using the second radio. The first radio may be used to send or receive information to and from access point 104 because the information associated with the management plane may not comprise Quality of Service (QoS) or latency sensitive information and therefore is sent or received using a lower frequency than that of the second radio. The second radio may be used to send or receive information from access point 110 because the information associated with the data plane may comprise QoS or latency sensitive information and therefore is sent or received using a higher frequency radio than that of the first radio. Because the first radio operates at a lower frequency the corresponding footprint (footprint 101) over which it may send or receive information to access point 104 may be larger than that of the second radio which may send or receive information to access point 110 within footprint 107.

As an example, the first radio in user device 114 may establish a connection with access point 104 first and access point may send a request to controller 112 via connection 124 to be authenticated, after which access point 104 may provide a facilitate a connection between the first radio and controller 112 so that the first radio can be authenticated by controller 112. After controller 112 authenticates the first radio, controller 112 may send a message to the first radio recommending at least one access point operating on a 60 GHz frequency that the second radio can connect to (access point 110). The first radio may then communicate to the second radio the at least one access point (access point 110) that the second radio should connect to. The second radio may then open at least one port on a wireless interface of the second radio and tune at least one receiver or transceiver to a 60 GHz frequency and determine if a basic service set identifier (BSSID) broadcast by access point 110. The second radio may measure the received signal strength from access point 110, and may communicate a measurement of the received signal strength (e.g., received signal strength indicator (RSSI)) to the first radio. The first radio may then send a message access point 104 with the BSSID of access point 110 and access point 104 and the first radio may communicate a cryptographic key to access point 110 and the second radio respectively. The first radio may send a signal to the second radio and access point 104 may send a signal to access point 110 indicating that data associated with a data plane should be transmitted between the second radio and access point 110. For instance, the second radio and/or access point 110 may implement one or more protocols that enable the second radio and/or access point 110 to transmit and receive frames comprising a plurality of bits between the second radio and access point 110. In some embodiments, a transmission control protocol (TCP) may be used to transmit and receive frames between the second radio and access point 110. For example, for an application being executed by a processor in user device 114 that requires a connection based transport protocol to be established between the processor and a processor associated with another device, TCP may be used. For instance, if the application is a web browser, an e-mail application, or file transfer application then TCP may be used. In other embodiments, a user datagram protocol (UDP) may be used to transmit and receive frames between the second radio and access point 110. For example, for an application being executed by a processor in user device 114 that does not require a connection based transport protocol to be established between the processor and a processor associated with another device, UDP may be used. For instance, if the application is a streaming video and/or audio service then UDP may be used to stream the service between the processor and a processor associated with a device hosting the streaming video and/or audio service.

Figure 2:
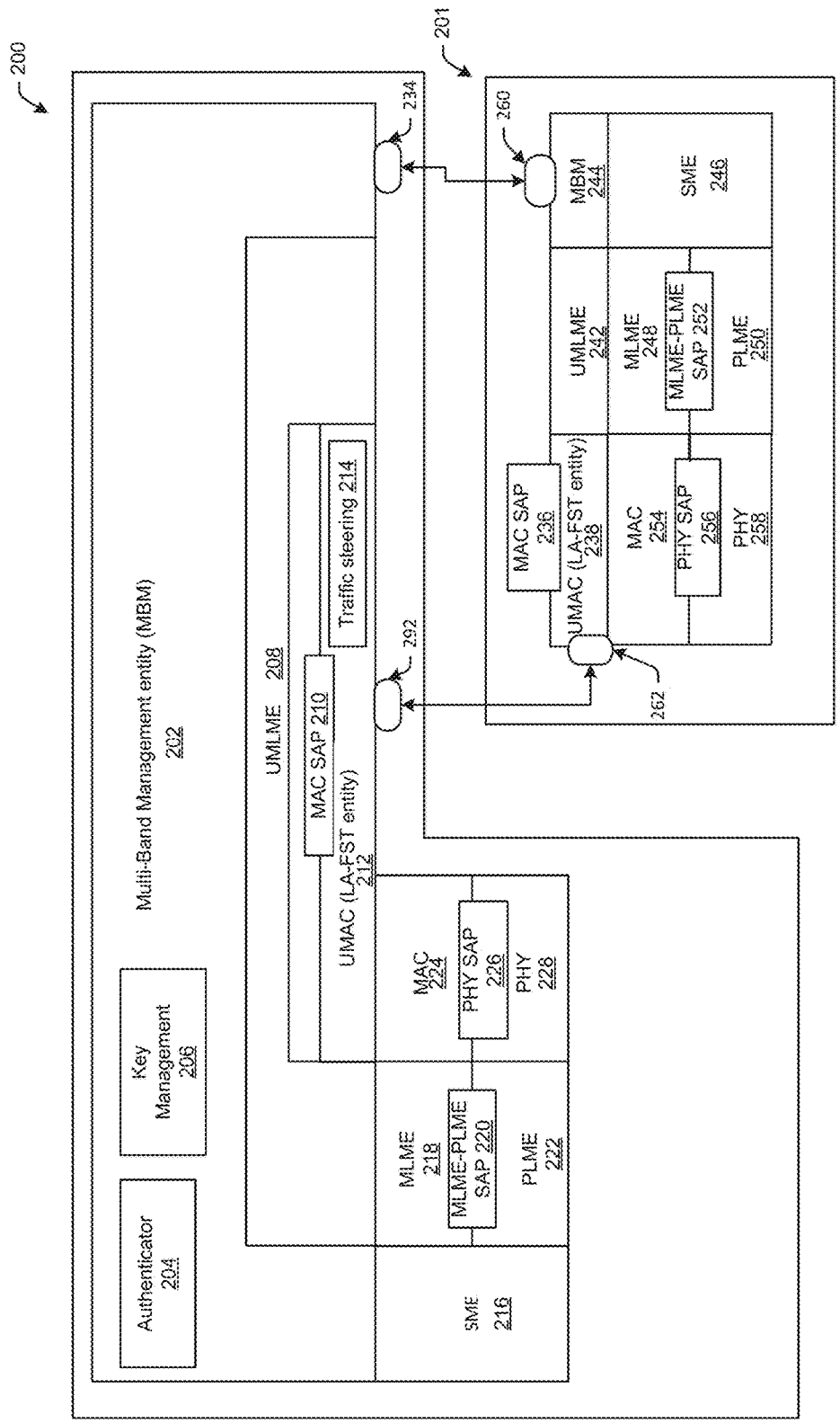
FIG. 2 depicts an illustrative logical connection between two access points, according to one or more example embodiments of the disclosure.

FIG. 2 illustrates am example logical connection between two wireless devices, according to one or more example embodiments of the disclosure. The two wireless devices may include two access points (access point 200 and access point 201) with logical connections between the access points 200 and 201. In particular, access point 200 may comprise the entities that may be used to implement the features of access points 102, 106, 108, and/or 110 as described herein, and access point 201 may comprise the entities that may be used to implement the features of access point 104. That is one or more of the logical entities included in access point 200 may also be included in one or more of access points 102, 106, 108, and/or 110 and one or more of the logical entities included in access point 201 may also be included in access point 104. Access point (AP) 200 may comprise one or more hardware components, firmware that may be executed by a processor that may cause the one or more hardware components to perform certain actions or functions, and/or non-permanent software that may be executed by the processor that may cause the one or more hardware components to perform certain actions consistent with the disclosure herein or modifications to the actions or functions consistent with the disclosure herein. Access point 200 may comprise one or more logical entities, as described below, which may be implemented using the one or more hardware components, firmware, and/or non-permanent software. Access point 200 may be referred to as a multi-band capable device.

Access point 200 may comprise a Multi-Band Management (MBM) entity 202 that may be responsible for setting up, configuring, removing, or transferring fast session transfers (FSTs) established on a first band/channel associated with first radio (e.g., PHY 228) to a second band/channel associated with a second radio (e.g., PHY 258) in access point 200. MBM entity 202 may be implemented in an application specific integrated circuit (ASIC), may coincide with one or more instructions executed by a processor, or may be a software defined radio (SDR) chipset.

Access point 200 may comprise upper media access control sublayer management entity (UMLME) 208. UMLME 208 may establish connections between access point 200 and a UMLME, for example UMLME 468, in a wireless device such as wireless device 400. UMLME 208 may comprise one or more hardware components, firmware that may be executed by a processor that may cause the one or more hardware components to perform certain actions, and/or non-permanent software that may be executed by the processor that may cause the one or more hardware components to generate or receive media access control (MAC) frames from wireless devices. The MAC frames that UMLME 208 may produce may be frames associated with registering wireless devices. The frames associated with registering wireless devices (registration frames) may be transmitted quasi-periodically by access point 200 in order to establish a timing synchronization function (TSF). The registration frames may include fields comprising a basic service set identification (BSS-ID), timestamp (for synchronization), traffic indication map to indicate when a wireless station should enter into low power mode if traffic is data is not available for it, and a field for roaming data. The registration frames may be transmitted as beacon frames to the wireless devices which may in turn measure the received signal strength (RSS) associated with the received beacon frames.

UMLME 208 may also associate and/or disassociate wireless devices that attempt to connect and disconnect to access point 200 as the wireless devices roam from a BSS not associated with access point 200 to a BSS associated with access point 200. UMLME 208 may broadcast at least one handoff beacon frame periodically to the wireless stations and the strongest beacon may be detected by the wireless devices. The handoff beacon frame may comprise fields including a timestamp, beacon interval, capabilities of access point 200, extended service set (ESS) ID, and traffic indication map (TIM). UMLME 208 may receive probe requests from the wireless devices and may send probe responses to the wireless devices in return, comprising the same information in the handoff beacon frame excluding the TIM. UMLME 208 may then receive a re-association request comprising information about the wireless devices and information about another UMLME associated with another access point that the wireless devices are being handed over from.

Access point 200 may comprise a media access control-service access point (MAC-SAP) 210 which may comprise one or more hardware components, firmware that may be executed by a processor that may cause the one or more hardware components to perform certain actions, and/or non-permanent software that may be executed by the processor that may cause the one or more hardware components to send and receive signals between UMLME 208 and upper media access control (UMAC) (link aggregation (LA)-fast session transfer FST entity) 212 corresponding to messages associated with fast session transfers of connections from first radio (e.g., PHY 228) to second radio (e.g., PHY 258). A session associated with a fast session transfer may comprise state information stored in a first memory associated with first radio (e.g., PHY 228) and a second memory associated with second radio (e.g., PHY 258). First radio (e.g., PHY 228) may communicate with second radio (e.g., PHY 258) via MBM 202. The state information may be stored in the first memory and the second memory before and after the fast session transfer. The state information may comprise block acknowledgement agreement messages, traffic stream (TS) information corresponding to data streams associated with the first and second radios, association state information, robust security network association (RSNA) information, security keys, sequence counter information, and packet number (PN) information, associated with first radio (e.g., PHY 228) and second radio (e.g., PHY 258).

Access point 200 may comprise authenticator 204 which may comprise one or more hardware components, firmware that may be executed by a processor that may cause the one or more hardware components to perform certain actions, and/or non-permanent software that may be executed by the processor that may cause the one or more hardware components to authenticate wireless devices such as wireless device 400. Authenticator 204 may comprise an authenticated port that may comprise a controlled logical port and an uncontrolled port either of which may be implemented in firmware or hardware. The controlled port may be controlled by a port access entity (PAE), such as IEEE 802.1x, that may be implemented in firmware to allow authorized data into the controlled port, and may prevent the ingress of unauthorized data to the controlled port or the egress of unauthorized data from the controlled port. The uncontrolled port may be used by PAE to transmit and receive frames comprising authorized data to and from a supplicant in a wireless device. The frames may be implemented using an extensible authentication protocol over local area network (EAPOL) frames. The EAPOL frames may be EAPOL-key frames which may carry EAPOL protocol data unit (PDU) comprising a field corresponding to all or part of an EAPOL-Key type. The EAPOL-Key frames may be used to perform a 4 way handshake in order to confirm that a pairwise management key (PMK) between wireless devices that are associated (wireless devices that have an association ID associated with the access point, or BSS, stored in memory) is the same and that the wireless devices are using it to encrypt frames sent to access point 200 and in particular station management entity (SME) 216. The 4 way handshake may also be performed to transfer a group temporal key (GTK) which may be a random value, assigned by a group source, which may be used to protect group addressed medium access (MAC) protocol data units (MPDUs) from that source. In some embodiments the group temporal key may be derived from a group master key (GMK) which may be an auxiliary key that may be used to generate the GTK. The EAPOL-Key frames may also be used to implement a group key handshake to update the GTK at one or more wireless devices. The EAPOL-Key frames may also be used to implement a peer key initial station-to-station link (STSL) master key (SMK) handshake wherein the SMK may be a random value generated by access point 200, an in particular by, during a SMK handshake. The SMK may be used to derive a STSL transient key (STK). The SMK handshake may include an exchange in which the SMK is transmitted by access point 200 to one or more wireless devices. The EAPOL-Key frames may also be used to implement an exchange associated with a final 4 way STK handshake in order to deliver the STK to an initiating and peer wireless device. The supplicant (wireless devices) may comprise corresponding authenticated port controlled and uncontrolled ports to exchange the EAPOL frames with the controlled and uncontrolled ports of access point 200.

Authenticator 204 may authenticate wireless devices (supplicants) requesting to be associated with access point 200. When supplicants are detected by SME 216 the authenticated port is enabled and set to an unauthorized state. In this state 802.1x data is allowed, and other data, such as Internet Protocol (IP) and Transmission Control Protocol (TCP) data or User Datagram Protocol (UDP) data may be ignored. Authenticator 204 may periodically transmit EAP-request Identity frames to a special Layer 2 address, and supplicants may open an authenticated port, and in particular an uncontrolled port of the authenticated port, to receive the EAP-request Identity frames. This may be referred to as initialization of authentication of the supplicants.

After the supplicants receive the EAP-request Identify frames the supplicants may transmit an EAP-response Identity frame comprising an identifier associated with the supplicants such as a user ID. Authenticator 204 may then encapsulate the EAP-response Identity frame in an authentication, authorization, and accounting (AAA) Access Request packet and may forward the encapsulated EAP-response Identity frame to an AAA server. In some embodiments, the AAA server may be a remote authentication dial-in user service (RADIUS) server. In some embodiments, the supplicants may also initiate or restart authentication by transmitting an EAPOL-Start frame to authenticator 204, which may reply with an EAP-Request Identity frame. After authenticator 204 transmits the encapsulated EAP-response Identity frame to the AAA server, authenticator 204 may receive an EAP Request frame encapsulated in an AAA access challenge packet from AAA server, and the EAP Request may include the EAP method used by the AAA server to authenticate supplicants. This may be referred to as an initiation of the authentication of the supplicants. In some embodiments, the EAP method may include EAP-MD5, EAP-POTP, EAP-GTC, EAP-TLS, EAP-IKEv2, EAP-SIM, EAP-AKA and EAP-AKA'. In other embodiments, the EAP method may include EAP-TLS, EAP-SIM, EAP-AKA, LEAP and EAP-TTLS. Yet still in other embodiments, vendor specific EAP methods may be used for the EAP method.

Authenticator 204 may encapsulate the EAP request in an EAPOL frame and transmit it to the supplicants. After the supplicants receive the EAP request the supplicants may start using the EAP method indicated in the EAP request. In some embodiments, the supplicants may transmit an EAP frame in an EAPOL frame to authenticator 204 which may in turn transmit the EAP frame to the AAA server in an AAA packet, wherein the EAP frame includes a negative acknowledgment (NAK) indicating the EAP methods that the supplicants want to perform. In some embodiments, a first supplicant may perform a first EAP method, and a second supplicant may perform a second EAP method. This may be referred to as the negotiation of the authentication method used to authenticate the supplicants.

After the supplicants and the AAA server agree on an EAP method, the supplicants may transmit EAP requests to the AAA server, in EAPOL frames and authenticator 204 may extract the EAP requests and encapsulate the EAP requests in AAA Request packets and transmit the EAP requests to the AAA server. Authenticator 204 may then receive AAA Response packets, from the AAA server comprising a EAP success message, which may in turn be encapsulated in an EAPOL frame and transmitted to the supplicants. The EAP success message may indicate that the supplicants have been authenticated. After the EAP success message is received, authenticator 204 may open the controlled port to the supplicants so that data can be sent between the supplicants and the AAA server or other (first) supplicants that have been authenticated by the AAA server to communicate with the supplicants.

Key management 206 may comprise one or more hardware components, firmware that may be executed by a processor that may cause the one or more hardware components to perform certain actions, and/or non-permanent software that may be executed by the processor that may cause the one or more hardware components to send and receive signals or messages to authenticator 204. Key management 206 may be implemented using a 4-Way Handshake, Group Key Handshake, and PeerKey Handshake as defined in IEEE 802.11 with access points or wireless stations. For example, a 4-Way Handshake or Group Key Handshake may be implemented between authenticator 204 and supplicant 464 using one or more keys stored or generated in key management 206.

Access point 200 may comprise media access control (MAC) service access point (SAP) 210 which, may comprise one or more hardware components, firmware that may be executed by a processor that may cause the one or more hardware components to perform certain actions, and/or non-permanent software that may be executed by the processor that may cause the one or more hardware components to send and receive signals or messages between UMLME 208 and UMAC link aggregation (LA)-fast session transfer (LA-FST) entity UMAC (LA-FST entity) 212. For example, MAC-SAP 210 may receive MAC frames associated with the data plane, and may transmit the MAC frames to a wireless device via PHY 228. In particular, traffic steering 214 may receive MAC frames, associated with the data plane, from a processor executing applications, and may steer the MAC frames to PHY 228 by transmitting a message or signal to UMAC (LA-FST entity) 212 which will in turn transmit a message or signal to MAC 224 indicating that a signal corresponding to the MAC frames should be transmitted on PHY 228 using one or more service primitives associated with PHY SAP 226.

Access point 200 may comprise UMAC (LA-FST entity) 212 which, may comprise one or more hardware components, firmware that may be executed by a processor that may cause the one or more hardware components to perform certain actions, and/or non-permanent software that may be executed by the processor that may cause the one or more hardware components to send and receive signals or messages between media access control service access point (MAC SAP) 210 and Traffic Steering 214. UMAC (LA-FST entity) 212 may store MAC or logic link layer state information (non-physical layer state information) about access point 200 and access point 201, and the information shared between access point 200 and access point 201. This information may be referred to session information. In particular, UMAC (LA-FST entity) 212 may transfer a session from access point 200 to access point 201 where access point 200 operates at first frequency and access point 201 operates at a second frequency. For example, there may be a first oscillator in physical layer (PHY) 228 of access point 200 that may oscillate at a frequency of 5 GHz, and there may be a second oscillator in physical layer (PHY) 258 of access point 201 that may oscillate at a frequency of 60 GHz, and UMAC (LA-FST entity) 212 may determine which physical layer to transfer the session to. In some embodiments UMAC (LA-FST entity) 212 may receive messages or signals from Traffic Steering 214 to transfer data associated with the data plane to PHY 228 and may receive messages or signal from Traffic Steering 214 to transfer data associated with the management plane to PHY 258.

Access point 200 may comprise media access control service access point (MAC SAP) 210 which, may comprise one or more hardware components, firmware that may be executed by a processor that may cause the one or more hardware components to perform certain actions, and/or non-permanent software that may be executed by the processor that may cause the one or more hardware components to send and receive signals or messages between UMLME 208 and UMAC (LA-FST entity) 212. MAC SAP 210 may comprise an ASIC enabling UMLME 208 to send one or more signals or messages (e.g., primitives) to UMAC (LA-FST entity) 212, and vice versa, that may enable UMLME 208 and UMAC (LA-FST entity) 212 to communicate. For example, UMLME 208 may correspond to a first ASIC and UMAC (LA-FST entity) 212 may correspond to a second ASIC and MAC SAP 210 may correspond to a third ASIC that may enable UMLME 208 and UMAC (LA-FST entity) 212 to communicate.

Access point 200 may station management entity (SME) 216 which, may comprise one or more hardware components, firmware that may be executed by a processor that may cause the one or more hardware components to perform certain actions, and/or non-permanent software that may be executed by the processor that may cause the one or more hardware components to send and receive signals or messages from PHY 228, as well as any changes in an operating channel, (e.g., using information obtained from out-of-band communication over-the-air frame exchanges). SME 216 is a cross-layer entity that may internally communicate with multiple layers. For example, SME 216 may communicate with MLME 218 and PLME 222 through a service access point (SAP) not shown. In some embodiments, SME 216 may have an interface application layer as well. SME 216 monitors and controls the operation of access point 200. An operator of access point 200 may control the operation of the device (e.g., specifying a SSID, BSSID, channel numbers, security keys, change the status of the device, adjust the received signal strength (RSS) threshold etc.) by issuing a series of commands, and SME 216 will send and/or receive signals or message to and/or from MLME 218 and PLME 222 in order to execute the commands. As an example, SME 216 may provide key management via an exchange of EAPOL-Key frames between Key Management 206 and Authenticator 204.

Access point 200 may comprise traffic steering 214 which, may comprise one or more hardware components, firmware that may be executed by a processor that may cause the one or more hardware components to perform certain actions, and/or non-permanent software that may be executed by the processor that may cause the one or more hardware components to send and receive signals or messages from UMAC (LA-FST entity) 212. Traffic steering 214 may control data associated with the management plane. In particular, traffic steering 214 may determine whether management plane frames should be transmitted via PHY 228 or PHY 258. In some embodiments, traffic steering 214 may determine that management plane frames should be transmitted via PHY 228 associated with an oscillator oscillating at a lower frequency (e.g., 5 GHz).

Access point 200 may comprise station management entity (SME) 216 which, may comprise one or more hardware components, firmware that may be executed by a processor that may cause the one or more hardware components to perform certain actions, and/or non-permanent software that may be executed by the processor that may cause the one or more hardware components to send and receive signals or messages from entities (e.g., MBM, 202, authenticator 204, key management 206, UMLME 208, MAC SAP 210, UMAC (LA-FST entity) 212, traffic steering 214, mac layer management entity (MLME) 218, mac layer management entity (MLME)-physical layer management entity (PLME) service access point (SAP) 220, physical layer management entity (PLME) 222, media access control (MAC) 224, physical layer (PHY) service access point (SAP) 226, and/or physical layer (PHY) 228). SME 216 may determine PHY 228 parameters, as well as any changes in the operating channel, for example, using information obtained via out-of-band communication or over-the-air frame exchange. In some embodiments, MBM 202 may be a circuit (e.g., application specific integrated circuit (ASIC)) within SME 216. In some embodiments, SME 216 may perform the actions of an authenticator, and optionally the supplicant and authentication server actions. For example, in an independent basic service set (IBSS), SME 216 may perform supplicant and authenticator actions and might also perform authentication server actions as well.

SME 216 may determine certain measurements associated with a channel on PHY 228 and/or PHY 258, and may determine whether switch PHY 228 and/or PHY 258 to a different channel. For example, SME 216 may cause to send a signal or message to MLME 218 requesting a channel measurement (e.g., channel impulse response) between a peer access point (e.g., access point 201) and one or more wireless devices associated with the peer access point. MLME 218 may forward the signal or message requesting the channel measurement to MLME 248 via PHY 228 and PHY 258. SME 246 in access point 201 may accept the signal or message requesting the channel measurement, and may send a channel measurement request to MLME 248 which may in turn measure a channel impulse response between PHY 258 and wireless devices associated with access point 201. SME 246 may receive channel impulse response measurements between PHY 258 and the wireless devices associated with access point 201 from MLME 248 and compile the channel impulse response measurements between PHY 258 and the wireless devices associated with access point 201 and forward the channel impulse response measurements to SME 216 via MLME 248, PHY 258, PHY 228, and MLME 218. The signal or message may correspond to a MAC frame.

Access point 200 may comprise mac layer management entity (MLME) 218 which, may comprise one or more hardware components, firmware that may be executed by a processor that may cause the one or more hardware components to perform certain actions, and/or non-permanent software that may be executed by the processor that may cause the one or more hardware components to send and receive signals or messages from SME 216, UMLME 208, MLME-PLME 220, and/or PLME 222. MLME 218 may comprise one or more application specific integrated circuits (ASICs) to determine channel switch timing information, MAC timing information, channel impulse response measurement protocol information, and channel impulse response measurement frame information. Channel switch timing information may include time in units of microseconds within which MLME 218 may switch from a first channel to a second channel. MAC timing information may include time in units of microseconds referenced from the beginning of a transmission of a first symbol in a frame to a last symbol transmitted in the frame, and/or receipt of a first symbol in a frame to a last symbol received in the frame. Channel impulse response measurement protocol information may comprise steps or procedures that may be used to request and receive channel impulse response measurements from peer access points as described above. Channel impulse response measurement frame information may include a format of a frame that may be used to send and/or receive requests for channel impulse response measurement frame information.

Access point 200 may comprise physical layer management entity (PLME) 222 which, may comprise one or more hardware components, firmware that may be executed by a processor that may cause the one or more hardware components to perform certain actions, and/or non-permanent software that may be executed by the processor that may cause the one or more hardware components to send and receive signals or messages to and from MLME 218 through MPLE-PLME SAP 220. In particular, PLME 222 may perform management of physical layer functions for PHY 218. For instance, when MLME 218 sends a channel impulse response measurement request frame to a peer MLME (e.g., MLME 248) MLME 218 may send at least one service primitive associated with MLME-PLME SAP 220, to PLME 222 which may in turn transmit the channel impulse response measurement request frame to PLME 250 which may in turn forward the channel impulse response measurement request frame to MLME 248 through MLME-PLME SAP 252 using the service primitives associated with MLME-PLME SAP 252. MLME-PLME SAP 252 may comprise an ASIC enabling MLME 218 to send one or more signals or messages (e.g., primitives) to PLME 222, and vice versa, that may enable MLME 218 and PLME 222 to communicate. For example, MLME 218 may correspond to a first ASIC and PLME 222 may correspond to a second ASIC and MLME-PLME SAP 252 may correspond to a third ASIC that may enable MLME 218 and PLME 222 to communicate.

Access point 200 may comprise media access control (MAC) 224 which, may comprise one or more hardware components, firmware that may be executed by a processor that may cause the one or more hardware components to perform certain actions, and/or non-permanent software that may be executed by the processor that may cause the one or more hardware components to send and receive signals or messages to and from PHY 228. In some embodiments, MAC 224 may be referred to the logical link control (LLC) layer. MAC 224 may generate media access control service data units (MSDUs) for transmission to a wireless device. MAC 224 may utilize PHY 228 to transport an MSDU to a peer MAC entity (e.g., a wireless device). The transmission of MSDUs may asynchronous and performed on a connectionless basis. By default, MSDU transport may be on a best-effort basis.

Access point 200 may comprise physical layer (PHY) 228 which, may comprise one or more hardware components, firmware that may be executed by a processor that may cause the one or more hardware components to perform certain actions, and/or non-permanent software that may be executed by the processor that may cause the one or more hardware components to send and receive signals or messages to and from MAC 224. PHY 228 may comprise one or more ASICs that perform a mapping of media access control protocol data units (MPDUs) into a framing format suitable for transmission of user data and management information to wireless devise and reception of user data and management information from wireless devices and one or more ASICs that may define characteristics of, and method of transmitting and receiving data through a wireless mesh comprising two or more wireless stations.

Access point 200 may comprise physical layer service access point (PHY SAP) 226 which, may comprise one or more hardware components, firmware that may be executed by a processor that may cause the one or more hardware components to perform certain actions, and/or non-permanent software that may be executed by the processor that may cause the one or more hardware components to send and receive signals or messages between MAC 224 and PHY 228. For example, PHY SAP 226 may comprise an ASIC enabling MAC 224 to send one or more signals or messages (e.g., primitives) to PHY 228, and vice versa, that may enable MAC 224 and PHY 228 to communicate. For example, MAC 224 may correspond to a first ASIC and PHY 228 may correspond to a second ASIC and PHY SAP 226 may correspond to a third ASIC that may enable MAC 224 and PHY 228 to communicate.

Access point 200 may comprise service access points 222 and 234 which, may comprise one or more hardware components, firmware that may be executed by a processor that may cause the one or more hardware components to perform certain actions, and/or non-permanent software that may be executed by the processor that may cause the one or more hardware components to send and receive signals or messages between access point 200 and access point 201. Service access points 222 and 234 may be wired (e.g., Ethernet ports) logical link control (LLC) service access points (SAPs) through which access points 200 and 201 may communicate. For example, access point 200 may correspond to access point 114 and access point 201 may correspond to access point 110 and SAP 292 may correspond to the connection between wired connections 124 and backhaul network 120, and SAP 234 may correspond to the connection between wired connection 130 and backhaul network 120. In some embodiments, each of SAP 292 and SAP 234 may correspond to traffic in a single direction. In other embodiments, only one of SAP 292 and SAP 234 may be used (e.g., SAP 292) and the other SAP (e.g., SAP 234) may be used if SAP 292 fails or can no longer be used. In other embodiments, both SAP 292 and SAP 234 may be used to send and receive information between access points 200 and 201. In particular, data associated with key management 206 may be transferred between access points 200 and 201 using SAPs 222 and 234. For example, access point 201 may be authenticated by authenticator 204 in access point 200 via SAP 292 and SAP 234.

SAP 262 and SAP 260 may correspond to SAPs on access point 201 and may be similar in function to SAP 292 and SAP 234. SAP 292 may logically be connected to SAP 262 and therefore may provide a LLC connection between UMAC (LA-FST entity) 212 and UMAC (LA-FST entity) 238. In particular, SAP 292 may be a wired ingress point to the internet from access point 200 and SAP 262 may be a wired egress point from the internet and may be used by UMAC (LA-FST entity) 212 to forward data plane frames to access point 260 to be transmitted to a wireless device associated with access points 200 and 201. For example, SAP 292 may correspond to a connection at which wired connection 124 connects to backhaul network 120 and SAP 262 may correspond to a connection at which wired connection 130 connects to access point 110, and UMAC (LA-FST entity) 212 may determine that one or more data plane frames have been received from an application layer that are time sensitive or require a certain Quality of Service (QoS), in which case UMAC (LA-FST entity) 212 may transmit the one or more data plane frames to UMAC (LA-FST entity) 238 out SAP 292 and the one or more data plane frames may be received on SAP 262.

SAP 234 and SAP 260 may be similarly used to connect MBM 202 and MBM 244, to enable management of management plane data frames. For example, a wireless device may send or receive management plane data frames to access point 201 and MBM 244 may forward the management plane data frames to access point 200 through SAPs 260 and 234 to MBM 202 and MBM 202 send a signal or message to the wireless device instructing the wireless device to send and receive data plane management frames to access point 200 on the same frequency at which access point 200 (oscillator associated with PHY 218) is operating at.

Access point 201 may comprise upper media access control sublayer management entity (UMLME) 242. UMLME 242 may establish connections between access point 201 and a UMLME, for example UMLME 468, in a wireless device such as wireless device 400. UMLME 242 may comprise one or more hardware components, firmware that may be executed by a processor that may cause the one or more hardware components to perform certain actions, and/or non-permanent software that may be executed by the processor that may cause the one or more hardware components to generate or receive media access control (MAC) frames from wireless devices. The MAC frames that UMLME 242 may produce may be frames associated with registering wireless devices. The frames associated with registering wireless devices (registration frames) may be transmitted quasi-periodically by access point 200 in order to establish a timing synchronization function (TSF). The registration frames may include fields comprising a basic service set identification (BSS-ID), timestamp (for synchronization), traffic indication map to indicate when a wireless station should enter into low power mode if traffic is data is not available for it, and a field for roaming data. The registration frames may be transmitted as beacon frames to the wireless devices which may in turn measure the received signal strength (RSS) associated with the received beacon frames.

UMLME 242 may also associate and/or disassociate wireless devices that attempt to connect and disconnect to access point 201 as the wireless devices roam from a BSS not associated with access point 201 to a BSS associated with access point 201. UMLME 242 may broadcast at least one handoff beacon frame periodically to the wireless stations and the strongest beacon may be detected by the wireless devices. The handoff beacon frame may comprise fields including a timestamp, beacon interval, capabilities of access point 201, extended service set (ESS) ID, and traffic indication map (TIM). UMLME 242 may receive probe requests from the wireless devices and may send probe responses to the wireless devices in return, comprising the same information in the handoff beacon frame excluding the TIM. UMLME 242 may then receive a re-association request comprising information about the wireless devices and information about another UMLME associated with another access point that the wireless devices are being handed over from.

Access point (AP) 201 may comprise one or more hardware components, firmware that may be executed by a processor that may cause the one or more hardware components to perform certain actions or functions, and/or non-permanent software that may be executed by the processor that may cause the one or more hardware components to perform certain actions consistent with the disclosure herein or modifications to the actions or functions consistent with the disclosure herein. Access point 201 may comprise one or more logical entities, as described below, which may be implemented using the one or more hardware components, firmware, and/or non-permanent software. Access point 201 may be referred to as a multi-band capable device.

Access point 201 may comprise a media access control-service access point (MAC-SAP) 236 which may comprise one or more hardware components, firmware that may be executed by a processor that may cause the one or more hardware components to perform certain actions, and/or non-permanent software that may be executed by the processor that may cause the one or more hardware components to send and receive signals between UMLME 242 and upper media access control (UMAC) (LA-fast session transfer FST entity) 238 corresponding to messages associated with fast session transfers of connections from second radio (e.g., PHY 258) to first radio (e.g., PHY 228). A session associated with a fast session transfer may comprise state information stored in a second memory associated with second radio (e.g., PHY 258) and a first memory associated with first radio (e.g., PHY 228). Second radio (e.g., PHY 258) may communicate with first radio (e.g., PHY 228) via MBM 242. The state information may be stored in the first memory and the second memory before and after the fast session transfer. The state information may comprise block acknowledgement agreement messages, traffic stream (TS) information corresponding to data streams associated with the first and second radios, association state information, robust security network association (RSNA) information, security keys, sequence counter information, and packet number (PN) information, associated with first radio (e.g., PHY 228) and second radio (e.g., PHY 258).

MAC-SAP 236 may receive MAC frames associated with the data plane, and may transmit the MAC frames to a wireless device via PHY 258. In particular, traffic steering 214 may receive MAC frames, associated with the data plane, from a processor executing applications, and may steer the MAC frames to PHY 258 by transmitting a message or signal to UMAC (LA-FST entity) 238, via SAPs 222 and 262, which will in turn transmit a message or signal to MAC 254 indicating that a signal corresponding to the MAC frames should be transmitted on PHY 258 using one or more service primitives associated with PHY SAP 256.

Access point 201 may comprise media access control (MAC) service access point UMAC (LA-FST entity) 238 which, may comprise one or more hardware components, firmware that may be executed by a processor that may cause the one or more hardware components to perform certain actions, and/or non-permanent software that may be executed by the processor that may cause the one or more hardware components to send and receive signals or messages to UMAC (LA-FST entity) 238. UMAC (LA-FST entity) 238 may store MAC or logic link layer state information (non-physical layer state information) associated with access point 201 and access point 201, and the information shared between access point 200 and access point 201. This information may be referred to session information. In particular, UMAC (LA-FST entity) 238 may receive a request to transfer a session from access point 200 to access point 201 where access point 200 operates at first frequency and access point 201 operates at a second frequency. For example, there may be a first oscillator in physical layer (PHY) 228 of access point 200 that may oscillate at a frequency of 5 GHz, and there may be a second oscillator in physical layer (PHY) 258 of access point 201 that may oscillate at a frequency of 60 GHz, and UMAC (LA-FST entity) 212 may determine which physical layer to transfer the session to. In some embodiments, UMAC (LA-FST entity) 238 may receive messages or signals from UMAC (LA-FST entity) 212 to transfer data associated with the data plane to PHY 258.

Access point 201 may comprise service access point station management entity (SME) 246 which, may comprise one or more hardware components, firmware that may be executed by a processor that may cause the one or more hardware components to perform certain actions, and/or non-permanent software that may be executed by the processor that may cause the one or more hardware components to send and receive signals or messages from PHY 258, as well as any changes in an operating channel, (e.g., using information obtained from out-of-band communication over-the-air frame exchanges). SME 246 is a cross-layer entity that may internally communicate with multiple layers. For example, SME 246 may communicate with MLME 248 and PLME 250 through a service access point (SAP) not shown. In some embodiments, SME 246 may have an interface application layer as well. SME 246 monitors and controls the operation of access point 201. An operator of access point 201 may control the operation of the device (e.g., specifying a SSID, BSSID, channel numbers, security keys, change the status of the device, adjust the received signal strength (RSS) threshold etc.) by issuing a series of commands, and SME 246 will send and/or receive signals or message to and/or from MLME 248 and PLME 250 in order to execute the commands.

SME 246 may cause the one or more hardware components to send and receive signals or messages from entities (e.g., MBM, 244, authenticator 204, key management 206, UMLME 208, MAC SAP 210, UMAC (LA-FST entity) 212, traffic steering 214, mac layer management entity (MLME) 218, mac layer management entity (MLME)-physical layer management entity (PLME) service access point (SAP) 220, physical layer management entity (PLME) 222, media access control (MAC) 224, physical layer (PHY) service access point (SAP) 226, and/or physical layer (PHY) 228). SME 216 may determine PHY 228 parameters, as well as any changes in the operating channel, for example, using information obtained via out-of-band communication or over-the-air frame exchange. In some embodiments, MBM 202 may be a circuit (e.g., application specific integrated circuit (ASIC)) within SME 216. In some embodiments, SME 216 may perform the actions of an authenticator, and optionally the supplicant and authentication server actions. For example, in an independent basic service set (IBSS), SME 216 may perform supplicant and authenticator actions and might also perform authentication server actions as well.

SME 216 may determine certain measurements associated with a channel on PHY 228 and/or PHY 258, and may determine whether switch PHY 228 and/or PHY 258 to a different channel. For example, SME 216 may cause to send a signal or message to MLME 218 requesting a channel measurement (e.g., channel impulse response) between a peer access point (e.g., access point 201) and one or more wireless devices associated with the peer access point. MLME 218 may forward the signal or message requesting the channel measurement to MLME 248 via PHY 228 and PHY 258. SME 246 in access point 201 may accept the signal or message requesting the channel measurement, and may send a channel measurement request to MLME 248 which may in turn measure a channel impulse response between PHY 258 and wireless devices associated with access point 201. SME 246 may receive channel impulse response measurements between PHY 258 and the wireless devices associated with access point 201 from MLME 248 and compile the channel impulse response measurements between PHY 258 and the wireless devices associated with access point 201 and forward the channel impulse response measurements to SME 216 via MLME 248, PHY 258, PHY 228, and MLME 218. The signal or message may correspond to a MAC frame.

Access point 200 may comprise MAC layer management entity (MLME) 218 which, may comprise one or more hardware components, firmware that may be executed by a processor that may cause the one or more hardware components to perform certain actions, and/or non-permanent software that may be executed by the processor that may cause the one or more hardware components to send and receive signals or messages from SME 216, UMLME 208, MLME-PLME 220, and/or PLME 222. MLME 218 may comprise one or more application specific integrated circuits (ASICs) to determine channel switch timing information, MAC timing information, channel impulse response measurement protocol information, and channel impulse response measurement frame information. Channel switch timing information may include time in units of microseconds within which MLME 218 may switch from a first channel to a second channel. MAC timing information may include time in units of microseconds referenced from the beginning of a transmission of a first symbol in a frame to a last symbol transmitted in the frame, and/or receipt of a first symbol in a frame to a last symbol received in the frame. Channel impulse response measurement protocol information may comprise steps or procedures that may be used to request and receive channel impulse response measurements from peer access points as described above. Channel impulse response measurement frame information may include a format of a frame that may be used to send and/or receive requests for channel impulse response measurement frame information.

Access point 200 may comprise physical layer management entity (PLME) 222 which, may comprise one or more hardware components, firmware that may be executed by a processor that may cause the one or more hardware components to perform certain actions, and/or non-permanent software that may be executed by the processor that may cause the one or more hardware components to send and receive signals or messages to and from MLME 218 through MPLE-PLME SAP 220. In particular, PLME 222 may perform management of physical layer functions for PHY 218. For instance, when MLME 218 sends a channel impulse response measurement request frame to a peer MLME (e.g., MLME 248) MLME 218 may send at least one service primitive associated with MLME-PLME SAP 220, to PLME 222 which may in turn transmit the channel impulse response measurement request frame to PLME 250 which may in turn forward the channel impulse response measurement request frame to MLME 248 through MLME-PLME SAP 252 using the service primitives associated with MLME-PLME SAP 252. MLME-PLME SAP 252 may comprise an ASIC enabling MLME 218 to send one or more signals or messages (e.g., primitives) to PLME 222, and vice versa, that may enable MLME 218 and PLME 222 to communicate. For example, MLME 218 may correspond to a first ASIC and PLME 222 may correspond to a second ASIC and MLME-PLME SAP 252 may correspond to a third ASIC that may enable MLME 218 and PLME 222 to communicate.

Access point 200 may comprise media access control (MAC) 224 which, may comprise one or more hardware components, firmware that may be executed by a processor that may cause the one or more hardware components to perform certain actions, and/or non-permanent software that may be executed by the processor that may cause the one or more hardware components to send and receive signals or messages to and from PHY 228. In some embodiments, MAC 224 may be referred to the logical link control (LLC) layer. MAC 224 may generate media access control service data units (MSDUs) for transmission to a wireless device. MAC 224 may utilize PHY 228 to transport an MSDU to a peer MAC entity (e.g., a wireless device). The transmission of MSDUs may asynchronous and performed on a connectionless basis. By default, MSDU transport may be on a best-effort basis.

Access point 200 may comprise physical layer (PHY) 228 which, may comprise one or more hardware components, firmware that may be executed by a processor that may cause the one or more hardware components to perform certain actions, and/or non-permanent software that may be executed by the processor that may cause the one or more hardware components to send and receive signals or messages to and from MAC 224. PHY 228 may comprise one or more ASICs that perform a mapping of media access control protocol data units (MPDUs) into a framing format suitable for transmission of user data and management information to wireless devise and reception of user data and management information from wireless devices and one or more ASICs that may define characteristics of, and method of transmitting and receiving data through a wireless mesh comprising two or more wireless stations.

Access point 200 may comprise physical layer service access point (PHY SAP) 226 which, may comprise one or more hardware components, firmware that may be executed by a processor that may cause the one or more hardware components to perform certain actions, and/or non-permanent software that may be executed by the processor that may cause the one or more hardware components to send and receive signals or messages between MAC 224 and PHY 228. For example, PHY SAP 226 may comprise an ASIC enabling MAC 224 to send one or more signals or messages (e.g., primitives) to PHY 228, and vice versa, that may enable MAC 224 and PHY 228 to communicate. For example, MAC 224 may correspond to a first ASIC and PHY 228 may correspond to a second ASIC and PHY SAP 226 may correspond to a third ASIC that may enable MAC 224 and PHY 228 to communicate. In some embodiments, AP 200 may also be referred to as an anchor AP and AP 201 may be referred to as a booster AP.

In some embodiments, a multi-band proxy device may be collocated with or not collocated with an access point (e.g., any of access points 102, 106, 108, or 110 which may comprise one or more of the components of access point 200), and may comprise components that may implement the methods of encapsulating and forwarding Ethertype frames received from the Internet and destined for a wireless device, and vice versa, based on traffic flows corresponding to or associated with different classes of traffic or Quality of Service (QoS) metrics. Multi-band proxy device and proxy device, may be used interchangeably.

Figure 3:
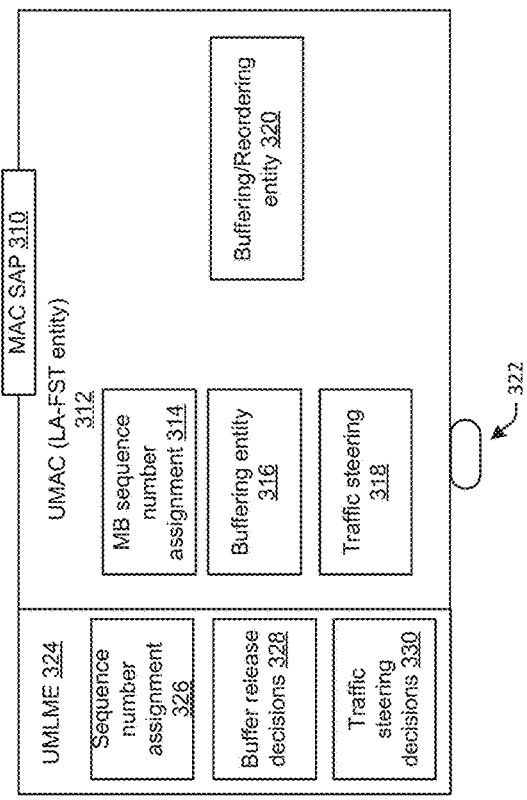
FIG. 3 depicts an illustrative proxy device, according to one or more example embodiments of the disclosure.

FIG. 3 depicts an illustrative proxy device, according to one or more example embodiments of the disclosure. Proxy device 300 may comprise one or more hardware components, firmware that may be executed by a processor that may cause the one or more hardware components to perform certain actions, and/or non-permanent software that may be executed by the processor that may cause the one or more hardware components to perform certain actions consistent with the disclosure herein or modifications to the actions consistent with the disclosure herein. Proxy device 300 may comprise one or more logical entities, as described below, which may be implemented using the one or more hardware components, firmware, and/or non-permanent software. Proxy device 300 may be referred to as a multi-band management device.

Proxy device 300 may transmit and receive uplink and downlink data to and from a first AP and/or a second AP that via a local area network (LAN) connection. In some embodiments, proxy device 300 may be collocated with the first AP, but may not be collocated with the second AP, or vice versa. For example, proxy device 300 may be hardware or firmware spanning UMAC (LA-FST entity) 212, UMLME 208, and MAC SAP 210 that may use one or more of the functions provided by UMAC (LA-FST entity) 212, UMLME 208, and MAC SAP 210 to implement the functions of proxy device 300. UMAC (LA-FST entity) 312 may implement one or more of the functions of UMAC (LA-FST entity) 212, UMLME 324 may implement one or more of the functions of UMLME 208, and MAC SAP 310 may implement one or more of the functions of 210. Service Access Point (SAP) 322 may implement one or more of the functions of SAP 292. When UMAC (LA-FST entity) 312 is collocated with AP 200, UMAC (LA-FST entity) 312 may receive uplink data packets from MAC 224. In particular, Buffering/Reordering entity 320 may receive the uplink data packets from MAC 224. Buffering/Reordering entity 320 may collect packets received on one or more interfaces and order the packets. The packets may be buffered until the point where they can be released to an upper layer in the correct order. An upper layer may be a network layer entity, or layer three entity, that is responsible for encapsulating data in packets and decapsulating data from packets. For example, if a total of ten packets are received and eight of the ten packets are received first, with sequence numbers 3-10, on a first wireless interface, (not shown, but may be similar to either PHY 454, PHY SAP 495, and MAC 476 or PHY 228, PHY SAP 226, and MAC 224) and the remaining two packets are received second, on a second wireless interface, (not shown, but may be similar to PHY 486, PHY SAP 483, MAC 478 or PHY 258, PHY SAP 256, and MAC 254) with sequence numbers 1 and 2 assigned to the two packet, then Buffering/Reordering entity 320 may buffer the eight packets which have sequence numbers 3-10 assigned to them until the two packets with sequence numbers 1 and 2 assigned to them are received. UMAC (LA-FST entity) 312 may also receive uplink data packets from AP 201, even though proxy device 300 is not collocated with it, because proxy device 300 may be connected to AP 201 via SAP 322 on proxy device 300 and SAP 262 on AP 201. That is AP 201 may be physically connected to proxy device 300 over a local area network (LAN), the Internet, or virtual local area network (VLAN), spanning the Internet. In particular, Buffering/Reordering entity 320 may receive uplink data packets from UMAC (LA-FST entity) 238 via a LAN connecting SAP 292 and SAP 262. UMAC (LA-FST entity) 312 may transmit downlink data packets to MAC 224 using the functions implemented by MB sequence number assignment 314, Buffering entity 316, and/or Traffic steering 318. MB sequence number assignment 314 may assign numbers to packets, so that received packets can be reorder if they are received out of order from different access points. For example, if eight packets are received with eight sequence numbers assigned to them, each of which is greater than the sequence numbers assigned to two packets which are received after the eight packets are received, then Buffering/Reordering entity can use the sequence numbers to ensure that the ten packets are order correctly before they are re-encapsulated in an Ethernet frame and forwarded out of an interface to their intended destination in the Internet (e.g., WAN 502). Buffering entity 316 may store packets until they can be transmitted or can be forwarded to the buffers of a wireless interface. Traffic steering entities, such as UM AC (LA-FST entity) 312, may remove packets from Buffering entity 316 and transfer them to a specific air interface. That is transfer them to a wireless interface comprising a MAC layer entity, MAC layer and PHY layer SAP entity that may be used by the MAY layer entity and a PHY layer entity to pass signals or messages between the MAC layer entity PHY layer entity. Any packets transferred to a specific air interface may be buffered in a buffering entity in the MAC layer entity. UMAC (LA-FST entity) 312 may also transmit downlink data packets to AP 201, even though proxy device 300 is not collocated with it, because proxy device 300 may be connected to AP 201 via SAP 322 on proxy device 300 and SAP 262 on AP 201. That is AP 201 may be physically connected to proxy device 300 over a local area network (LAN), the Internet, or virtual local area network (VLAN), spanning the Internet. In particular. UMAC (LA-FST entity) 312 may transmit downlink data packets to UMAC (LA-FST entity) 238 using the functions implemented by MB sequence number assignment 314, Buffering entity 316, and/or Traffic steering 318. Sequence number assignment 326 may . . . Buffer release decisions 328 may . . . Traffic steering decisions 330 may . . . .

Figure 4:
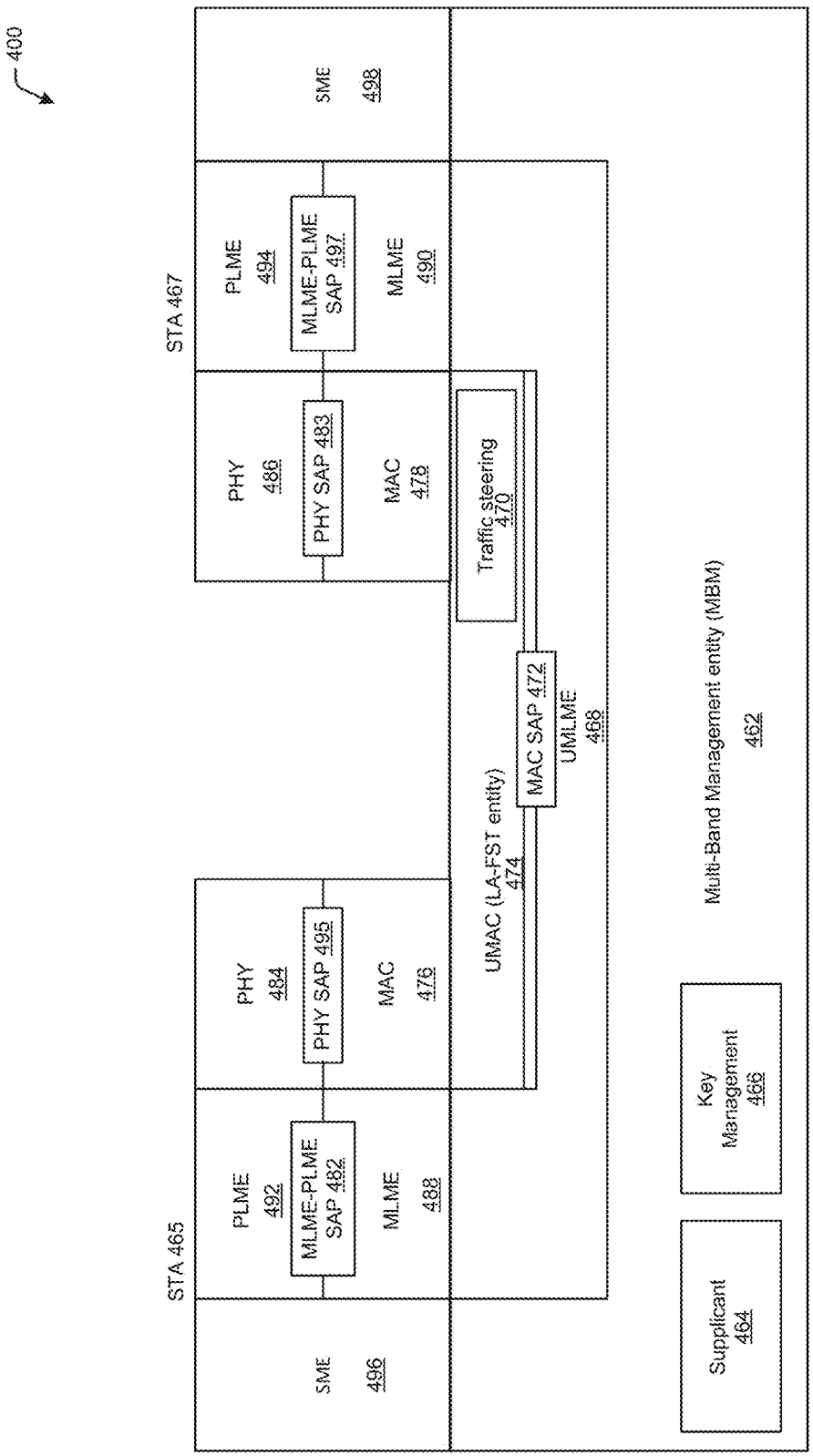
FIG. 4 depicts an illustrative logical connection between two wireless stations in a wireless client, according to one or more example embodiments of the disclosure.

FIG. 4 illustrates a logical connection between two wireless stations in a wireless device 400, according to one or more example embodiments of the disclosure. The wireless device 400 may include one or more components that may be used to operate user device 114 and may multiband client 516. As explained above user device 114 may comprise a first wireless radio comprising one or more of the components of STA 465 operating at a first frequency (e.g., 5 GHz) and a second wireless radio comprising one or more of the components of STA 467 operating at a second frequency (e.g., 60 GHz). As discussed below multiband client 516 comprises a first station (STA 512) which may correspond to STA 465 and STA 514 which may correspond to STA 467. Wireless device 400 may comprise one or more hardware components, firmware that may be executed by a processor that may cause the one or more hardware components to perform certain actions, and/or non-permanent software that may be executed by the processor that may cause the one or more hardware components to perform certain actions consistent with the disclosure herein or modifications to the actions consistent with the disclosure herein. Wireless device 400 may be referred to as a multi-band capable device. Wireless device 400 may comprise a first wireless station (STA 465) and a second wireless station (STA 467). STA 465 may comprise station management entity (SME) 296, physical layer management entity (PLME) 492, media access control layer management entity physical layer management entity service access point (MLME-PLME SAP) 482, media access control layer management entity (MLME) 288, physical layer (PHY) 484, physical layer service access point (PHY SAP) 295, media access control (MAC) 276. STA 467 may comprise station management entity (SME) 498, physical layer management entity (PLME) 494, media access control layer management entity physical layer management entity service access point (MLME-PLME SAP) 497, media access control layer management entity (MLME) 490, physical layer (PHY) 486, physical layer service access point (PHY SAP) 483, media access control (MAC) 478.

Wireless device 400 may further comprise upper media access control (link aggregation-fast session transfer entity) (UMAC (LA-FST entity) 474, traffic steering 470, media access control service access point (MAC SAP) 472, upper media access control layer management entity (UMLME) 468, multi-band management entity (MBM) 262, supplicant 464, and key management 466.

Multi-Band Management (MBM) entity 462 may be responsible for setting up, configuring, removing, or transferring fast session transfer (FST) sessions established on a first band/channel associated with first radio (e.g., PHY 484) to a second band/channel associated with a second radio (e.g., PHY 486). MBM entity 262 may be implemented in an application specific integrated circuit (ASIC), may coincide with one or more instructions executed by a processor, or may be a software defined radio (SDR) chipset.

Key management 466 may comprise one or more hardware components, firmware that may be executed by a processor that may cause the one or more hardware components to perform certain actions, and/or non-permanent software that may be executed by the processor that may cause the one or more hardware components to send and receive signals or messages to supplicant 464. Key management 466 may be implemented using a 4-Way Handshake, Group Key Handshake, and PeerKey Handshake as defined in IEEE 802.11 with access points or wireless stations. For example, a 4-Way Handshake or Group Key Handshake may be implemented between authenticator 204 and supplicant 464 using one or more keys stored or generated in key management 206.

Wireless device 400 may comprise upper media access control sublayer management entity (UMLME) 468. UMLME 468 may establish connections between wireless device 400 and a UMLME, for example UMLME 208, in an access point such as access point 200. UMLME 468 may comprise one or more hardware components, firmware that may be executed by a processor that may cause the one or more hardware components to perform certain actions, and/or non-permanent software that may be executed by the processor that may cause the one or more hardware components to generate or receive media access control (MAC) frames from wireless devices. The MAC frames that UMLME 468 may produce may be frames associated with registering wireless devices. The frames associated with registering wireless devices (registration frames) may be transmitted quasi-periodically by wireless device 400 in order to establish a timing synchronization function (TSF). The registration frames may include fields comprising a basic service set identification (BSS-ID), timestamp (for synchronization), traffic indication map to indicate when a wireless station should enter into low power mode if traffic is data is not available for it, and a field for roaming data. The registration frames may be transmitted as beacon frames to the wireless devices which may in turn measure the received signal strength (RSS) associated with the received beacon frames.

Wireless device 400 may comprise UMAC (LA-FST entity) 474 which, may comprise one or more hardware components, firmware that may be executed by a processor that may cause the one or more hardware components to perform certain actions, and/or non-permanent software that may be executed by the processor that may cause the one or more hardware components to send and receive signals or messages between media access control service access point (MAC SAP) 210 and Traffic Steering 470. UMAC (LA-FST entity) 474 may store MAC or logic link layer state information (non-physical layer state information) about STA 465 and STA 467, and the information shared between STA 465 and STA 467. This information may be referred to session information. In particular, UMAC (LA-FST entity) 474 may transfer a session from STA 465 to STA 467 where STA 465 operates at first frequency and STA 467 operates at a second frequency. For example, there may be a first oscillator in physical layer (PHY) 484 may oscillate at a frequency of 5 GHz, and there may be a second oscillator in physical layer (PHY) 486 that may oscillate at a frequency of 60 GHz, and UMAC (LA-FST entity) 474 may determine which physical layer to transfer the session to. In some embodiments UMAC (LA-FST entity) 474 may receive messages or signals from Traffic Steering 470 to transfer data associated with the data plane to PHY 484 and may receive messages or signal from Traffic Steering 470 to transfer data associated with the management plane to PHY 486.

Wireless device 400 may comprise media access control service access point (MAC SAP) 472 which, may comprise one or more hardware components, firmware that may be executed by a processor that may cause the one or more hardware components to perform certain actions, and/or non-permanent software that may be executed by the processor that may cause the one or more hardware components to send and receive signals or messages between UMLME 468 and UMAC (LA-FST entity) 474. MAC SAP 472 may comprise an ASIC enabling UMLME 468 to send one or more signals or messages (e.g., primitives) to UMAC (LA-FST entity) 474, and vice versa, that may enable UMLME 468 and UMAC (LA-FST entity) 474 to communicate. For example, UMLME 468 may correspond to a first ASIC and UMAC (LA-FST entity) 474 may correspond to a second ASIC and MAC SAP 472 may correspond to a third ASIC that may enable UMLME 468 and UMAC (LA-FST entity) 474 to communicate.

Wireless device 400 may comprise traffic steering 470 which, may comprise one or more hardware components, firmware that may be executed by a processor that may cause the one or more hardware components to perform certain actions, and/or non-permanent software that may be executed by the processor that may cause the one or more hardware components to send and receive signals or messages from UMAC (LA-FST entity) 474. Traffic steering 470 may control data associated with the management plane. In particular, traffic steering 470 may determine whether management plane frames should be transmitted via PHY 484 or PHY 486. In some embodiments, traffic steering 470 may determine that management plane frames should be transmitted via PHY 484 associated with an oscillator oscillating at a lower frequency (e.g., 5 GHz).

The components (e.g., SME 495, PLME 492, MLME-PLME SAP 482, MLME 488, MAC 476, PHY SAP 295, and PHY 484) of STA 465 may be similar in functionality and design to those of the components (e.g., SME 216, PLME 222, MLME-PLME SAP 220, MLME 218, MAC 224, PHY SAP 226, and PHY 228) of access point 200 and the components of (e.g., SME 498, PLME 494, MLME-PLME SAP 497, MLME 490, MAC 478, PHY SAP 483, and PHY 486) may be similar in functionality and design to those of the components (e.g., SME 246, PLME 250, MLME-PLME SAP 252, MLME 248, MAC 254, PHY SAP 256, and PHY 258). In some embodiments, the hardware used to implement the components in access points 200 and 201 and wireless device 400 may be exactly the same. For example, wireless device 300 may serve as an access point and supplicant 464 may implement the same functionality as authenticator 204 and therefore can be used as an access point such as access point 200.

Figure 5:
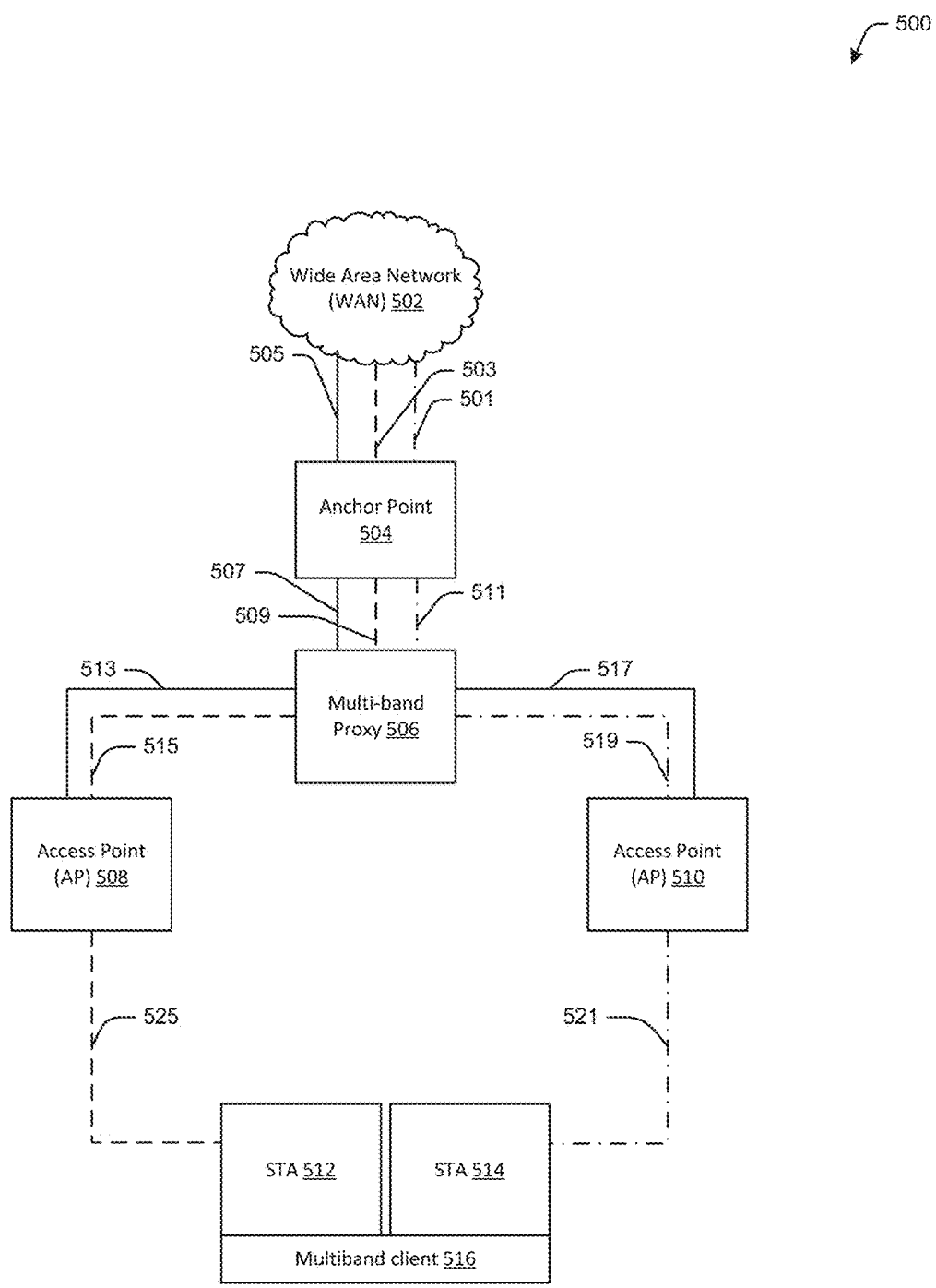
FIG. 5 depicts an illustrative logical connection between an anchor point, proxy device, two access points, and wireless client comprising two wireless stations, according to one or more example embodiments of the disclosure.

In some embodiments, the multi-band proxy may not be collocated with either access point, and may be a standalone device that is connected to the access points via an Ethernet connection, as illustrated in FIG. 5. For example, FIG. 5 depicts an illustrative logical network comprising an anchor point, proxy device, two access points, and wireless client comprising two wireless stations, according to one or more example embodiments of the disclosure. Local area network 500 may comprise Wide Area Network (WAN) 502, anchor point 504, multi-band proxy 506, Access Point (AP) 508, Access Point (AP) 510, and multiband client 516 comprising STA 512 and STA 514. WAN 502 may comprise a plurality of routers and switches that connect to the Internet or cloud services either of which may be provided by an Internet Service Provider (ISP).

In an example embodiment, AP 508 may comprise one or more of the hardware, firmware, and/or software of AP 200, AP 510 may comprise one or more of the hardware, firmware, and/or software of AP 201, and Multi-band Proxy 506 may comprise one or more of the hardware, firmware, and/or software of proxy device 300. AP 508, AP 510, and/or Multi-band Proxy 506 may comprise one or more of the logical entities described above, which may be implemented using the one or more hardware components, firmware, and/or non-permanent software described above. AP 508, AP 510, and Multi-band Proxy 506 may implement one or more of the functions provided by the logical entities of AP 200, AP 201, and proxy device 300, respectively. Multiband client 516 may be a wireless client comprising STA 512, wherein STA 512 comprises a first radio, and may further comprise STA 514, wherein STA 514 comprises a second radio. Multiband client 516 may be implemented using one or more of the components or entities of FIG. 4. That is multiband client 516 may include one or more of the components or entities of wireless device 400. STA 512 may comprise one or more of the hardware, firmware, and/or software of STA 465, and STA 514 may comprise one or more of the hardware, firmware, and/or software of STA 467 in FIG. 4. AP 508 and STA 512 may operate at 5 GHz, and AP 510 and STA 514 may operate at 60 GHz. In particular, the first radio and second radio may operate at 5 GHz and 60 GHz respectively.

WAN 502 may be connected to Anchor Point 504 via connection 505 which may be a Ethernet connection (logical connection), but the physical connection may be a coaxial cable or fiber cable link or connection provided by the ISP. Anchor Point 504 may be connected to Multi-band Proxy 506 via connection 507 which may be an Ethernet connection (logical connection), but the physical connection may be a coaxial cable or fiber cable link or connection provided by either the ISP or a network owned and operated by company or corporation that connects to the Internet at Anchor Point 504 through WAN 502. Multi-band Proxy 506 may be connected to AP 508 via connection 513 which may be an Ethernet connection (logical connection), but the physical connection may be a coaxial cable or fiber cable link or connection. Multi-band Proxy 506 may be connected to AP 510 via connection 517 which may be an Ethernet connection (logical connection), but the physical connection may be a coaxial cable or fiber cable link or connection. AP 508 and AP 510 may be connected to STA 512 and STA 514, respectively, via wireless connection 525 and wireless connection 521 respectively.

Connection 505 may carry or transport data 503 and 501. Data 503 may comprise first data exchanged between a first server application hosted on a first server and a first client application executing on multiband client 516 and data 501 may comprise second data exchanged between a second server application hosted on a second server and a second client application executing on multiband client 516. The first server and second server may be connected to WAN 502 via the Internet. For example, connection 505 may carry or transport first data (e.g., data 503), associated with a first application, to anchor point 504; connection 507 may carry or transport data 509, which is the same as data 503, to Multi-band Proxy 506; connection 513 may carry or transport data 515, which is the same as data 509, to AP 508; and AP 508 may transmit the first data, on wireless connection 525, to STA 512. STA 512 may then in turn forward the first data to the first application on multiband client 516. Similarly connection 505 may carry or transport second data (e.g., data 501), associated with a second application, to anchor point 504; connection 507 may carry or transport data 511, which is the same as data 501, to Multi-band Proxy 506; connection 517 may carry or transport data 519, which is the same as data 511, to AP 510; and AP 510 may transmit the second data, on wireless connection 521, to STA 514. STA 514 may then in turn forward the second data to the second application on multiband client 516. As mentioned above FIG. 5 illustrates an embodiment in which the multiband proxy is not collocated with either access point and may be a standalone device that may forward frames from the anchor point (controller) to multiband clients via the access points and may forward frames from the multiband clients received via the access points to the anchor point.

The wireless devices disclosed herein may generate frames destined for the Internet and therefore may be encapsulated by the multi-band proxy in an Ethertype frame that so that the frames can be forwarded to the Internet using IEEE 802.3 forwarding protocols. In particular, the frames forwarded by multi-band interfaces are described in FIGS. 6-10 and the encapsulation method for encapsulating and forwarding these multi-band layer 2 data units are described in FIGS. 17-19. In particular a new Ethertype frame is disclosed wherein legacy devices with frame forwarding capabilities such as IEEE 802.3 may forward the Ethertype frames to wireless devices from multi-band proxy devices and vice versa. And the Ethertype frames may indicate that an Ethernet frame is encapsulated in the Ethertype frame that is destined for an Internet device connected to the multi-band proxy devices, via a network controller, or vice versa. The indication of the Ethertype may be in a media access control (MAC) header of the Ethertype frame. The encapsulation methods disclosed herein may enable the aggregation of two or more wireless links between a multi-band client and access points that the multi-band client is connected to. The Ethertype frames may include information about the type of data being transmitted on the given links so that a multi-band proxy device can combine data belonging to the same traffic stream that may be transmitted over different links. Accordingly, the forwarding, encapsulation methods, and frames disclosed herein may be used by the multi-band proxy devices, access points, and wireless devices so that data can be aggregated by the multi-band proxy as the wireless devices are transmitting data to the Internet through the multi-band proxy.

Figure 6:
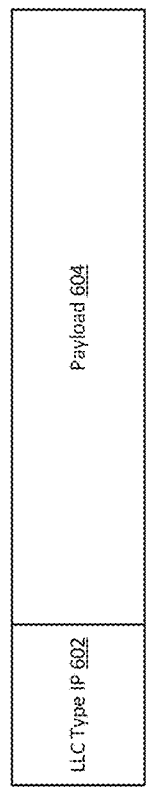
FIG. 6-16 depict fields of various frames, according to one or more example embodiments of the disclosure.

Frame 600 may be a frame format that may be used by a wireless device when the wireless device has data to transmit. For example, MAC 476 and/or MAC 478 may generate frame 600 when data has to be transmitted by wireless device 400. The data may be included in a payload field and a logical link control (LLC) header field may be added to the payload field so that a receiving multiband proxy device, for example multiband proxy device 500, can forward the payload field in an Ethernet frame to the Internet. In particular, multiband proxy device 500 may comprise one or more of the components of proxy device 300 and UMLME 324 and UMAC (LA-FST entity) 312 may receive frame 600 and forward frame 600 out of an Ethernet interface. The payload of a frame such as frame 600 may comprise a packet, and when a LLC header field is appended to the payload field and thus the packet, the resulting data unit may be a frame. Thus frame 600 comprises a packet preceded by a LLC header field. FIG. 6 depicts fields of a frame, according to one or more example embodiments of the disclosure. Frame 600 may comprise a logical link layer control (LLC) header (e.g., LLC Type IP 602) with a type field set to Internet Protocol (IP), indicating that an IP packet is included a payload field (e.g., Payload 604) trailing the LLC header. The type field may indicate the length of the header in hexadecimal digits, and the hexadecimal digits may be recorded in a LLC header field (not shown) which corresponds to the type of packet included in the payload field. In particular, LLC Type IP 602 may be set to a value corresponding to the length of the LLC header field, and the length of the LLC header field may be eight octets, wherein each octet may be represented by two alphanumeric digits.

For example, if an IP packet is included in the payload field, the LLC header field may contain octets AA-AA-03-00-00-00-08-00 which may be used to indicate to each receiving device that inspects LLC Type IP 602 that an IP packet for use over Ethernet according to IEEE Std. 802.3 is contained in Payload 604.

Figure 7:
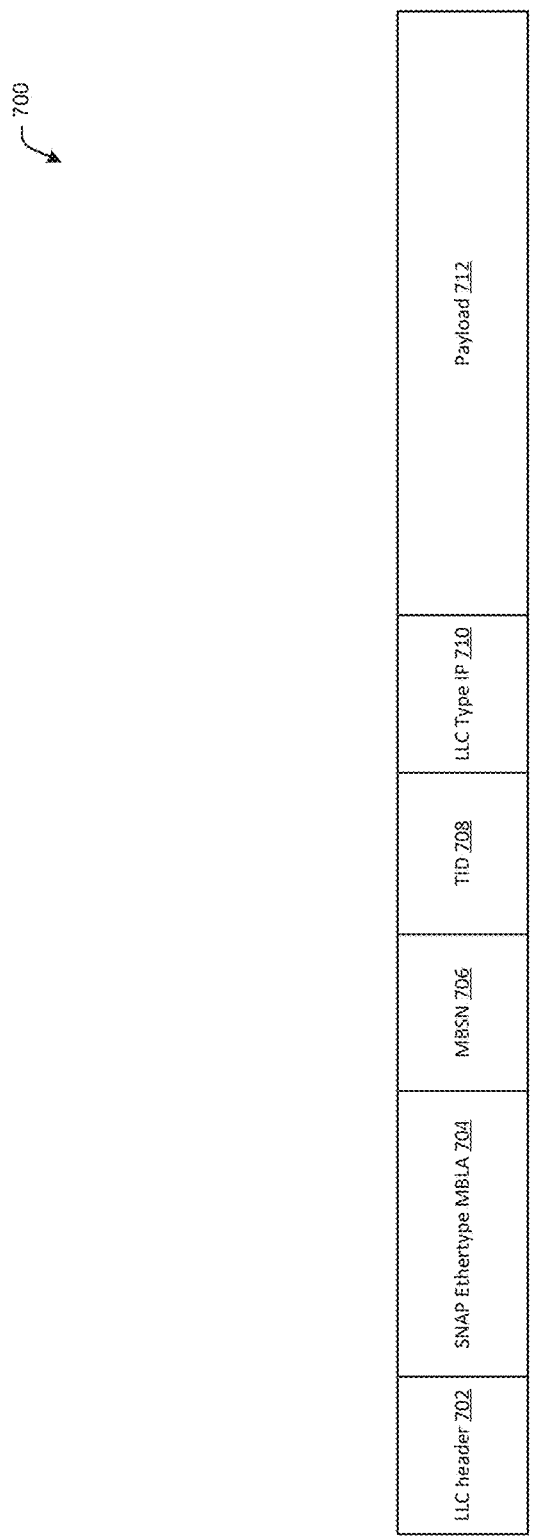

Frame 700 may be a frame that may be an Ethertype frame which may encapsulate frame 600 as an Ethertype frame, so that UMLME 324 and UMAC (LA-FST entity) 312 of proxy device 300 can determine what type of frame is in the payload field of frame 700, and determine if the data in the payload field corresponds to traffic transmitted from a wireless device that may be associated with a particular QoS. FIG. 7 depicts fields of a frame, according to one or more example embodiments of the disclosure. Frame 700 may comprise a link layer control (LLC) header (e.g., LLC header 702), subnetwork access protocol Ethertype multiband link aggregation (SNAP ETHERTYPE MBLA) 704 field, multiband sequence number (MBSN) 706 field, traffic identifier (TID) number, logical link layer control (LLC) header (e.g., LLC Type IP 710), and Payload 712. LLC header 702 may comprise a destination service access point (DSAP) field (not shown), a source service access point (SSAP) field (not shown), and a control field. The DSAP field may be an 8-bit long field that represents the logical addresses of a network layer entity (e.g., an access point) intended to receive a packet. The SSAP field may be an 8-bit long field that represents the logical address of the network layer entity (e.g., a network layer entity in a wireless client) that created the packet. The control field may be eight or sixteen bits depending on a connection type established between the network layer entity that created the packet and the network entity intended to receive the packet. In some embodiments, the control field may comprise a first set of eight bits unique indicating that the protocol data units (PDUs) carrying the message are unnumbered and the connection type is connectionless. In other embodiments, the control field may comprise a second set of sixteen unique bits indicating that the PDUs have sequence numbers assigned to them, and the connection type is connection-oriented. Yet still further in other embodiments, the control field may comprise a third set of sixteen unique bits indicating the PDUs are for used for supervisory functions at the LLC layer of the network layer entity that created the packet and the network layer entity that is intended to receive the packet. The DSAP and SSAP fields may be set to a value of 170 or hexadecimal value of AA to indicate that SNAP ETHERTYPE MBLA 704 is trailing LLC header 702.

SNAP Ethertype MBLA 704 may be a field comprising an IEEE organizationally unique identifier (OUI) field comprising octets and a protocol ID field comprising two octets. The OUI field may represent a number uniquely assigned to an organization implementing a specific Ethertype protocol. For example, an organization providing virtual private networking (VPN) services may be assigned an OUI that may be used to indicate that organization. The protocol ID field may indicate the Ethertype protocol being used, which in this case may be a multiband link aggregation (MBLA) protocol. As an example, when a device (e.g., a proxy device) receives a frame comprising SNAP Ethertype MBLA 704, the proxy device may determine that a MBLA protocol is being used by a transmitting device (e.g., wireless client) to transmit IP packets, in frames according to the MBLA protocol, and that the MBLA protocol should be used by the proxy device to transmit IP packets, in frames, to the wireless client.

MBSN 706 may be a sequence number used to keep track of a sequence of frames transmitted by a device. In some embodiments, a wireless radio or station (STA) in a wireless client, may receive a packet in a queue associated with the STA and may insert a number in MBSN 706 indicating an order associated with the frame, carrying the packet, relative to other frames previously transmitted by the STA. The number in MBSN 706 may be used by a receiving device (e.g., a proxy device) to reorder packets based on the number in MBSN 706 as explained below with reference to FIGS. 19 and 22. For example, a packet may arrive in the queue for the STA that must be transmitted using three different frames. Accordingly the STA may assign three different numbers to each of the MBSNs transmitting a third of the packet. In particular there will be three frames transmitted by the STA and each of the frames will comprise a MBSN field (e.g., MBSN 706).

TID 708 may be a field comprising an entry corresponding to an identifier used by a network layer entity or higher layer entity of an OSI stack to distinguish medium access control (MAC) service data units (MSDUs) to MAC entities (e.g., UMLME 468) that support quality of service (QoS) within the MAC data service. TID 708 may comprise a field that indicates the transmit stream and/or transmit category that a frame belongs to. The transmit stream and/or transmit category may contain information about the QoS of a traffic (data) that is transmitted between two STAs within a wireless client. The transmit stream and/or transmit category may comprise information about the conditions of the stream at each STA, and the information may be queried by either STA from the other. The information may comprise transmitting STA performance metrics for the traffic as it is being measured. Trigger conditions may be included in the transmit stream and/or transmit category field that may initiate triggered transmit stream and/or transmit category measurement reports upon detection by a STA of the trigger conditions. The transmit stream and/or transmit category may correspond to a traffic flow, and for a given QoS there may be a transmit stream and/or transmit category associated with the QoS.

LLC Type IP 710 may be similar to LLC Type IP 602 and Payload 712 may be similar to Payload 604.

Figure 8:
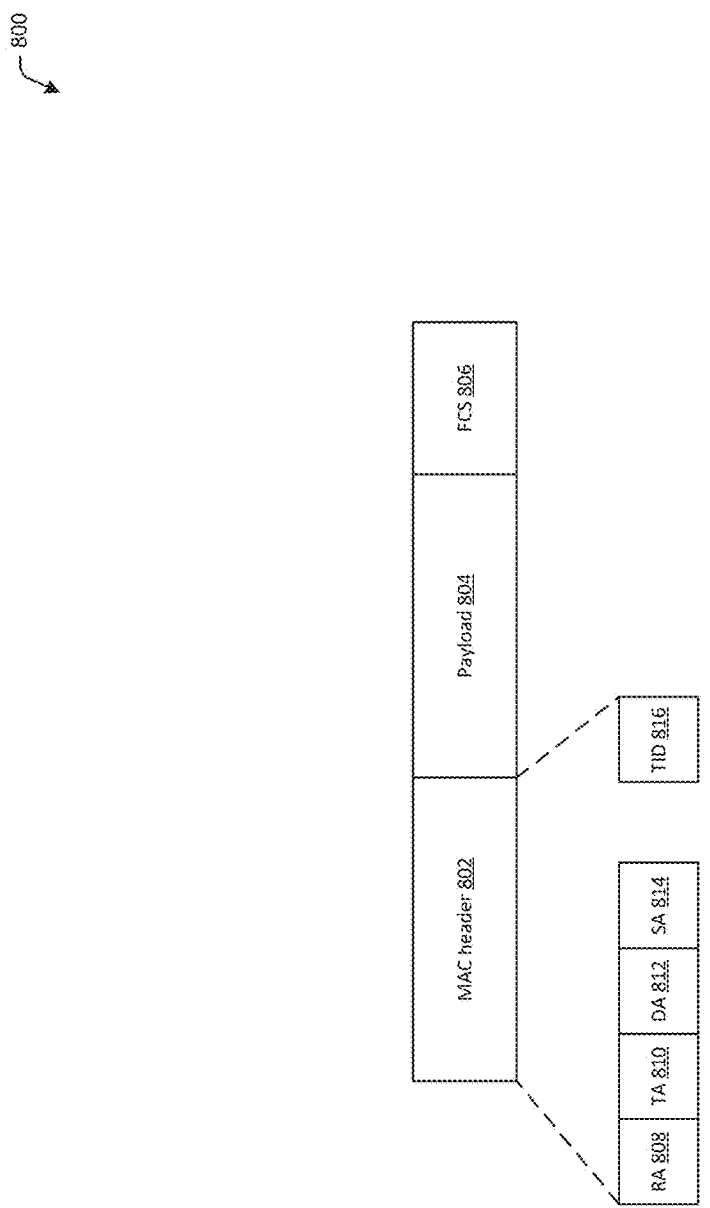

Frame 800 may be an IEEE 802.11 frame that may be transmitted by a wireless device, for example multiband client 516, and in particular a MAC entity or component such as MAC 476, and transmitted to an access point such as 200, and received and decapsulated by MAC 224. FIG. 8 depicts fields of a frame, according to one or more example embodiments of the disclosure. Frame 800 may comprise a media access control header (MAC header 802), a payload (e.g., Payload 804), and a frame check sequence (e.g., FCS 806). MAC header 802 may comprise a receiver address field (e.g., RA 808), a transmitter address field (e.g., TA 810), a destination address field (e.g., DA 812), a source address field (e.g., SA 814), and a traffic identifier (TID) number field (e.g., TID 816).

RA 808 may be the address of an AP to which frame 800 is being transmitted to. In some embodiments, RA 808 may be the STA address associated with a wireless radio of an AP. RA 808 may contain an IEEE MAC individual or group address that identifies the intended immediate recipient STA(s) (e.g., an AP), on the wireless medium for the information contained in the frame 800.

TA 810 may be the address of a wireless radio (STA) transmitted frame 800. TA 810 may contain an IEEE MAC address that identifies the STA that has transmitted, onto the wireless medium, the MPDU contained in the frame 800. In some embodiments, there TA 810 may comprise an Individual/Group bit that is set to 0, which means that the address recorded in TA 810 is the individual address of the STA; otherwise TA 810 may be a bandwidth signaling TA indicating that frame 800 carries additional information in a scrambling sequence for request to send (RTS) frames, channel width selection for control frames, and channel width information for non-high throughput (non-HT) and non-high throughput duplicate physical protocol data units (PPDUs).

DA 812 may be the address of a destination device or media access control (MAC) layer address associated with the destination device of frame 800. For example, the destination device may be a server hosting a service that exchanges packets with an application executing on a wireless client, and the destination device may have a plurality of MAC layer addresses associated with different ports that transmit and receive packets associated with the service. DA 812 may be the address of one of, or a subset of, the MAC layer addresses. In some embodiments, DA 812 may be a MAC layer address associated with the subset of MAC layer addresses, and therefore an frames destined for a MAC layer address in the subset of MAC layer addresses may be transmitted to DA 812 which may be associated with a first port, and the first port may forward the frame to ports associated with the subset of MAC layer addresses. DA 812 may contain an IEEE MAC individual or group address that identifies the MAC entity or entities intended as the final recipient(s) of a MSDU (or fragment thereof) or an aggregated MAC service data unit (A-MSDU).

SA 814 may be the address of a MAC of a wireless client that created frame 800. SA 814 may contain an IEEE MAC individual address that identifies the MAC entity from which the transfer of the MSDU (or fragment thereof) or A-MSDU, contained in frame 800 was initiated. In some embodiments, SA 814 may comprise an Individual/Group bit that may be 0.

Payload 804 may comprise frame 700, and FCS 806 may be a FCS number that is calculated by a transmitting device (e.g., AP) based on data in the frame, and in particular payload 804. The FCS number may be added to the end of a frame that is sent. When a destination device (e.g., proxy device) receives the frame the FCS number is recalculated and compared with the FCS number included in the frame. If the recalculated FCS number is not the same as the FCS number transmitted in the frame, an error is assumed and the frame is discarded. The transmitting device may compute a cyclic redundancy check on the entire frame and append FCS 806 as a trailer to the data. The receiving destination device may compute the cyclic redundancy check on the frame using the same algorithm used to generate the cyclic redundancy check, and may compare it to FCS 806. This may enable the receiving device to detect whether any data was lost or altered in transit. In some embodiments, if an error is detected, it may discard the data, and request retransmission of the frame.

In some embodiments, FCS 806 may be transmitted in such a way that the receiving device can compute a running sum over the entire frame, together with the trailing FCS, expecting to see a fixed result (such as zero) when it is correct. For Ethernet and other IEEE 802 protocols, this fixed result, may be a CRC32 residue. When transmitted and used in this way, FCS 806 generally appears immediately before a frame-ending delimiter.

Figure 9:
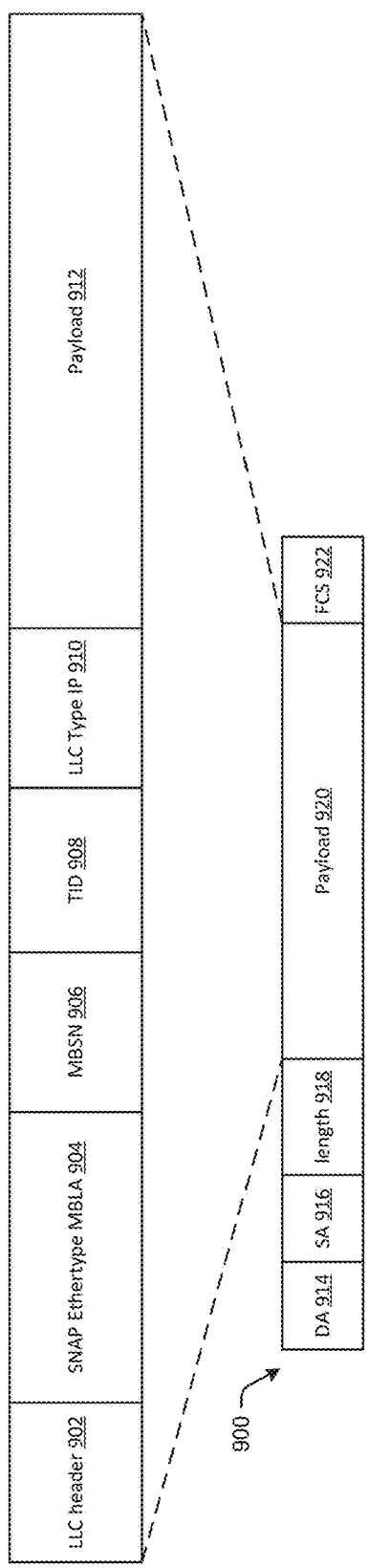

Frame 900 may be an Ethernet frame comprising frame 700, wherein frame 900 the payload field of 900 may be a packet comprising an Ethertype frame. That is, Ethertype frame 700 may be encapsulated as a packet in frame 900, and may be transmitted by an access point to a multi-band proxy device which may in turn route the packet in the payload field of the encapsulated frame to the Internet. FIG. 9 depicts fields of a frame, according to one or more example embodiments of the disclosure. Frame 900 may comprise DA 914, SA 916, length 918, payload 920, and FCS 922. DA 914 may comprise similar information to that in DA 812, SA 916 may comprise similar information to that in SA 814, length 918 may comprise a plurality of bits indicating the number of bits in payload 920, and FCS 922 may comprise similar information to that in FCS 806, but may be different because the fields proceeding payload 920 (i.e., DA 914, SA 916, and length 918) may be different than the field proceeding payload 804 (i.e., MAC header 802). Accordingly, FCS 922 may be different than FCS 806. LLC header 902 may comprise information similar to that in LLC header 702, SNAP Ethertype MBLA 904 may comprise information similar to that in SNAP Ethertype MBLA 704, MSBN 906 may comprise similar information to that in MBSN 706, TID 908 may comprise similar information to that in TID 708, LLC Type IP 910 may comprise similar information to that in LLC Type IP 710, and Payload 912 may comprise similar information to that in Payload 712. Frame 900 may be used with proxy device 300 when it is operating in a non-stateless mode. That is because frame 900 does not include an address of proxy device 300, the transmitting device, for example an access point, must remember the state of the network to which it is connected to and proxy device 300. In other words, the access point must store a forwarding table that may be used by the access point, that is, for example, MAC 224 or MAC 254 may consult the forwarding table, to lookup an interface that frame 900 should be transmitted out of so that it reaches proxy device 300 based on DA 914. Because there may be a plurality devices connected to the network connecting proxy device 300 to the access point, the access point may have to store a forwarding table for each of the plurality of devices thereby increasing the amount of time that the access point must spend determining which interface to forward frame 900 out of as compared to stateless forwarding.

Figure 10:
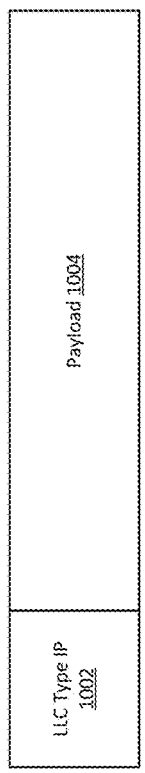

Frame 1000 may be the same frame as frame 600, and the payload field of frame 1000 may include the same packet as frame 600. Frame 1000 may be received by multi-band proxy 506 and may be forwarded to the Internet based on a destination address field in the received frame, wherein the received frame is frame 900. FIG. 10 depicts fields of a frame, according to one or more example embodiments of the disclosure. Frame 1000 may comprise LLC Type IP 1002 may comprise similar information to that in LLC Type IP 602 and Payload 1004 may comprise similar information to that in payload 604. As an example, a STA in a wireless client, and in particular UMAC (LA-FST entity) 474, may receive data to be transmitted in frame 600, from UMLME 468, and traffic steering 470 may determine that frame 600 should be transmitted via STA 465, and therefore will instruct UMAC (LA-FST entity) 474 to send a signal to MAC 476 to generate frame 600 and to include the data in payload 604. Before the signal is sent to MAC 476, UMAC (LA-FST entity) 474 may encapsulate LLC Type IP 602 and Payload 604 in subsequent frames as illustrated in FIGS. 7 and 8, and then UMCA (LA-FST entity) 747 may then send the signal to MAC 476, which in turn may then send a signal to PHY 484 using one or more primitives provide by PHY SAP 495, and PHY 484 (e.g., a transceiver or transmitter) may transmit frame 800 comprising frame 600. An AP (e.g., AP 201) may receive a version of frame 800 and may recover frame 600 by removing the encapsulating frames illustrated in FIGS. 7 and 8. AP 200 may receive frame 800 via PHY 228 and PHY 228 may send a signal to MAC 224 using one or more primitives in PHY SAP 226 and MAC 224 may transmit a signal to UMAC (LA-FST entity) 212 which may decapsulate frame 800 to recover frame 600 and may send a signal to UMLME 208 using one or more primitives of MAC SAP 210 where UMLME 208 may inspect LLC Type IP 604 to determine which Ethernet port to forward the frame out of to reach the destination address recorded in DA 914.

The wireless devices disclosed herein may generate frames destined for the Internet and therefore may be encapsulated by the multi-band proxy in an Ethertype frame that so that the frames can be forwarded to the Internet using IEEE 802.3 forwarding protocols. In particular, the frames forwarded by multi-band interfaces are described in FIGS. 11-15 and the encapsulation method for encapsulating and forwarding these multi-band layer 2 data units are described in FIGS. 20-22. In particular a new Ethertype frame is disclosed wherein legacy devices with frame forwarding capabilities such as IEEE 802.3 may forward the Ethertype frames to wireless devices from multi-band proxy devices and vice versa. And the Ethertype frames may indicate that an Ethernet frame is encapsulated in the Ethertype frame that is destined for an Internet device connected to the multi-band proxy devices, via a network controller, or vice versa. The indication of the Ethertype may be in a media access control (MAC) header of the Ethertype frame. The encapsulation methods disclosed herein may enable the aggregation of two or more wireless links between a multi-band client and access points that the multi-band client is connected to. The Ethertype frames may include information about the type of data being transmitted on the given links so that a multi-band proxy device can combine data belonging to the same traffic stream that may be transmitted over different links. Accordingly, the forwarding, encapsulation methods, and frames disclosed herein may be used by the multi-band proxy devices, access points, and wireless devices so that data can be aggregated by the multi-band proxy as the wireless devices are transmitting data to the Internet through the multi-band proxy.

Frame 1100 may be a frame format that may be used by a wireless device when the wireless device has data to transmit. For example, MAC 476 and/or MAC 478 may generate frame 1100 when data has to be transmitted by wireless device 400. The data may be included in a payload field and a logical link control (LLC) header field may be added to the payload field so that a receiving multiband proxy device, for example multiband proxy device 500, can forward the payload field in an Ethernet frame to the Internet. In particular, multiband proxy device 500 may comprise one or more of the components of proxy device 300 and UMLME 324 and UMAC (LA-FST entity) 312 may receive frame 1100 and forward frame 1100 out of an Ethernet interface. The payload of a frame such as frame 1100 may comprise a packet, and when a LLC header field is appended to the payload field and thus the packet, the resulting data unit may be a frame. Thus frame 600 comprises a packet preceded by a LLC header field.

Figure 11:
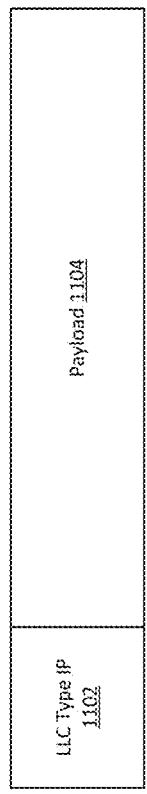

FIG. 11 depicts fields of a frame, according to one or more example embodiments of the disclosure. Frame 1100 may comprise a logical link layer control (LLC) header (e.g., LLC Type IP 1102) with a type field set to Internet Protocol (IP), indicating that an IP packet is included a payload field (e.g., Payload 604) trailing the LLC header. The type field may indicate the length of the header in hexadecimal digits, and the hexadecimal digits may be recorded in a LLC header field (not shown) which corresponds to the type of packet included in the payload field. In particular, LLC Type IP 1102 may be set to a value corresponding to the length of the LLC header field, and the length of the LLC header field may be eight octets, wherein each octet may be represented by two alphanumeric digits. For example, if an IP packet is included in the payload field, the LLC header field may contain octets AA-AA-03-00-00-00-08-00 which may be used to indicate to each receiving device that inspects LLC Type IP 1102 that an IP packet for use over Ethernet according to IEEE Std. 802.3 is contained in Payload 1104.

Figure 12:
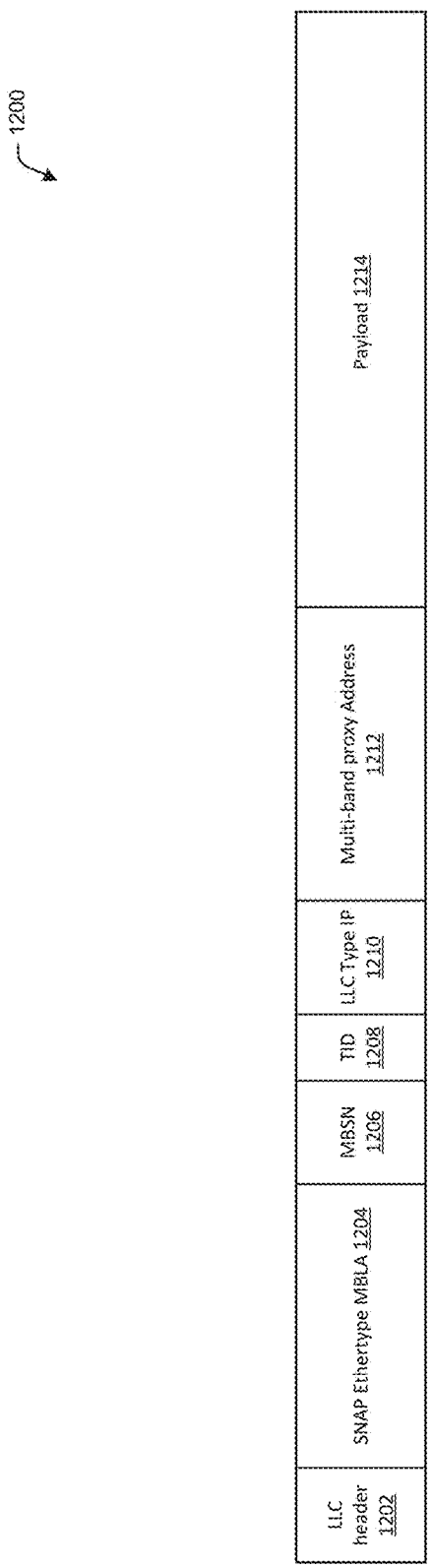

Frame 1200 may be a frame that may be an Ethertype frame which may encapsulate frame 1100 as an Ethertype frame, so that UMLME 324 and UMAC (LA-FST entity) 312 of proxy device 300 can determine what type of frame is in the payload field of frame 1200, and determine if the data in the payload field corresponds to traffic transmitted from a wireless device that may be associated with a particular QoS. Frame 1200 may also include the address of proxy device 300, which may be an IP address, so that frame 1200 can be sent directly to proxy device 300 without having to store and look up an interface in a forwarding table to transmit frame 1200 out of. This may be referred to as a stateless forwarding, because the state, of a network to which proxy device 300 and the transmitting device of the frame (e.g., an access point) are connected to does not need to be stored in order for frame 1200 to be forwarded. In other words the packet is being routed according to an IP routing protocol because the IP address is included in frame 1200, and is used to determine a network interface and consequently a layer 2 interface out of which frame 1200 which contains the packet needs to be transmitted out of That is, the access point does not have to store a forwarding table, or routing table, to determine which interface to transmit frame 1200 out of in frame 1500 below. A network layer entity in the access point may simply read the address of proxy device 300 included in frame 1200 and lookup a corresponding interface out of which frame 1200 should be transmitted to proxy device 300. This is in contrast to non-stateless forwarding of forwarding frame 900 to proxy device 300, wherein the state of the network, that is portions of the network must be stored so that UMLME 324 and UMAC (LA-FST entity) 312 can determine which layer 2 interface to instruct a MAC in proxy 300 to forward frame 1200. FIG. 12 depicts fields of a frame, according to one or more example embodiments of the disclosure. Frame 1200 may comprise a link layer control (LLC) header (e.g., LLC header 1202), subnetwork access protocol Ethertype multiband link aggregation (SNAP ETHERTYPE MBLA) 1204 field, multiband sequence number (MBSN) 1206 field, traffic identifier (TID) 1208, logical link layer control (LLC) header (e.g., LLC Type IP 1210), and Payload 1214. LLC header 1202 may comprise a destination service access point (DSAP) field (not shown), a source service access point (SSAP) field (not shown), and a control field. The DSAP field may be an 8-bit long field that represents the logical addresses of a network layer entity (e.g., an access point) intended to receive a packet. The SSAP field may be an 8-bit long field that represents the logical address of the network layer entity (e.g., a network layer entity in a wireless client) that created the packet. The control field may be eight or sixteen bits depending on a connection type established between the network layer entity that created the packet and the network entity intended to receive the packet. In some embodiments, the control field may comprise a first set of eight bits unique indicating that the protocol data units (PDUs) carrying the message are unnumbered and the connection type is connectionless. In other embodiments, the control field may comprise a second set of sixteen unique bits indicating that the PDUs have sequence numbers assigned to them, and the connection type is connection-oriented. Yet still further in other embodiments, the control field may comprise a third set of sixteen unique bits indicating the PDUs are for used for supervisory functions at the LLC layer of the network layer entity that created the packet and the network layer entity that is intended to receive the packet. The DSAP and SSAP fields may be set to a value of 170 or hexadecimal value of AA to indicate that SNAP ETHERTYPE MBLA 1204 is trailing LLC header 1202. Multi-band proxy Address 1212 may be a MAC address associated with a proxy device such as proxy device 500.

Figure 13:
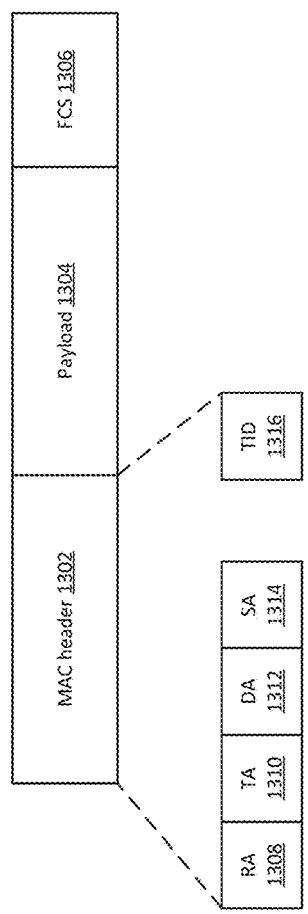

Frame 1300 may be an IEEE 802.11 frame that may be transmitted by a wireless device, for example multiband client 516, and in particular a MAC entity or component such as MAC 476, and transmitted to an access point such as 200, and received and decapsulated by MAC 224. FIG. 13 depicts fields of a frame, according to one or more example embodiments of the disclosure. Frame 1300 may comprise a media access control header (MAC header 1302), a payload (e.g., Payload 1304), and a frame check sequence (e.g., FCS 1306). MAC header 1302 may comprise a receiver address field (e.g., RA 1308), a transmitter address field (e.g., TA 1310), a destination address field (e.g., DA 1312), a source address field (e.g., SA 1314), and a traffic identifier (TID) number field (e.g., TID 1316).

RA 1308 may be the address of an AP to which frame 1300 is being transmitted to. In some embodiments, RA 1308 may be the STA address associated with a wireless radio of an AP. RA 1308 may contain an IEEE MAC individual or group address that identifies the intended immediate recipient STA(s) (e.g., an AP), on the wireless medium for the information contained in the frame 1300.

TA 1310 may be the address of a wireless radio (STA) transmitted frame 1300. TA 1310 may contain an IEEE MAC address that identifies the STA that has transmitted, onto the wireless medium, the MPDU contained in the frame 1300. In some embodiments, there TA 1310 may comprise an Individual/Group bit that is set to 0, which means that the address recorded in TA 1310 is the individual address of the STA; otherwise TA 1310 may be a bandwidth signaling TA indicating that frame 1300 carries additional information in a scrambling sequence for request to send (RTS) frames, channel width selection for control frames, and channel width information for non-high throughput (non-HT) and non-high throughput duplicate physical protocol data units (PPDUs).

DA 1312 may be the address of a destination device or media access control (MAC) layer address associated with the destination device of frame 1300. For example, the destination device may be a server hosting a service that exchanges packets with an application executing on a wireless client, and the destination device may have a plurality of MAC layer addresses associated with different ports that transmit and receive packets associated with the service. DA 1312 may be the address of one of, or a subset of, the MAC layer addresses. In some embodiments, DA 1312 may be a MAC layer address associated with the subset of MAC layer addresses, and therefore an frames destined for a MAC layer address in the subset of MAC layer addresses may be transmitted to DA 1312 which may be associated with a first port, and the first port may forward the frame to ports associated with the subset of MAC layer addresses. DA 1312 may contain an IEEE MAC individual or group address that identifies the MAC entity or entities intended as the final recipient(s) of a MSDU (or fragment thereof) or an aggregated MAC service data unit (A-MSDU).

SA 1314 may be the address of a MAC of a wireless client that created frame 1300. SA 1314 may contain an IEEE MAC individual address that identifies the MAC entity from which the transfer of the MSDU (or fragment thereof) or A-MSDU, contained in frame 1300 was initiated. In some embodiments, SA 1314 may comprise an Individual/Group bit that may be 0.

Payload 1304 may comprise frame 700, and FCS 1306 may be a FCS number that is calculated by a transmitting device (e.g., AP) based on data in the frame, and in particular payload 1304. The FCS number may be added to the end of a frame that is sent. When a destination device (e.g., proxy device) receives the frame the FCS number is recalculated and compared with the FCS number included in the frame. If the recalculated FCS number is not the same as the FCS number transmitted in the frame, an error is assumed and the frame is discarded. The transmitting device may compute a cyclic redundancy check on the entire frame and append FCS 1306 as a trailer to the data. The receiving destination device may compute the cyclic redundancy check on the frame using the same algorithm used to generate the cyclic redundancy check, and may compare it to FCS 1306. This may enable the receiving device to detect whether any data was lost or altered in transit. In some embodiments, if an error is detected, it may discard the data, and request retransmission of the frame.

In some embodiments, FCS 1306 may be transmitted in such a way that the receiving device can compute a running sum over the entire frame, together with the trailing FCS, expecting to see a fixed result (such as zero) when it is correct. For Ethernet and other IEEE 1302 protocols, this fixed result, may be a CRC32 residue. When transmitted and used in this way, FCS 1306 generally appears immediately before a frame-ending delimiter.

Figure 14:
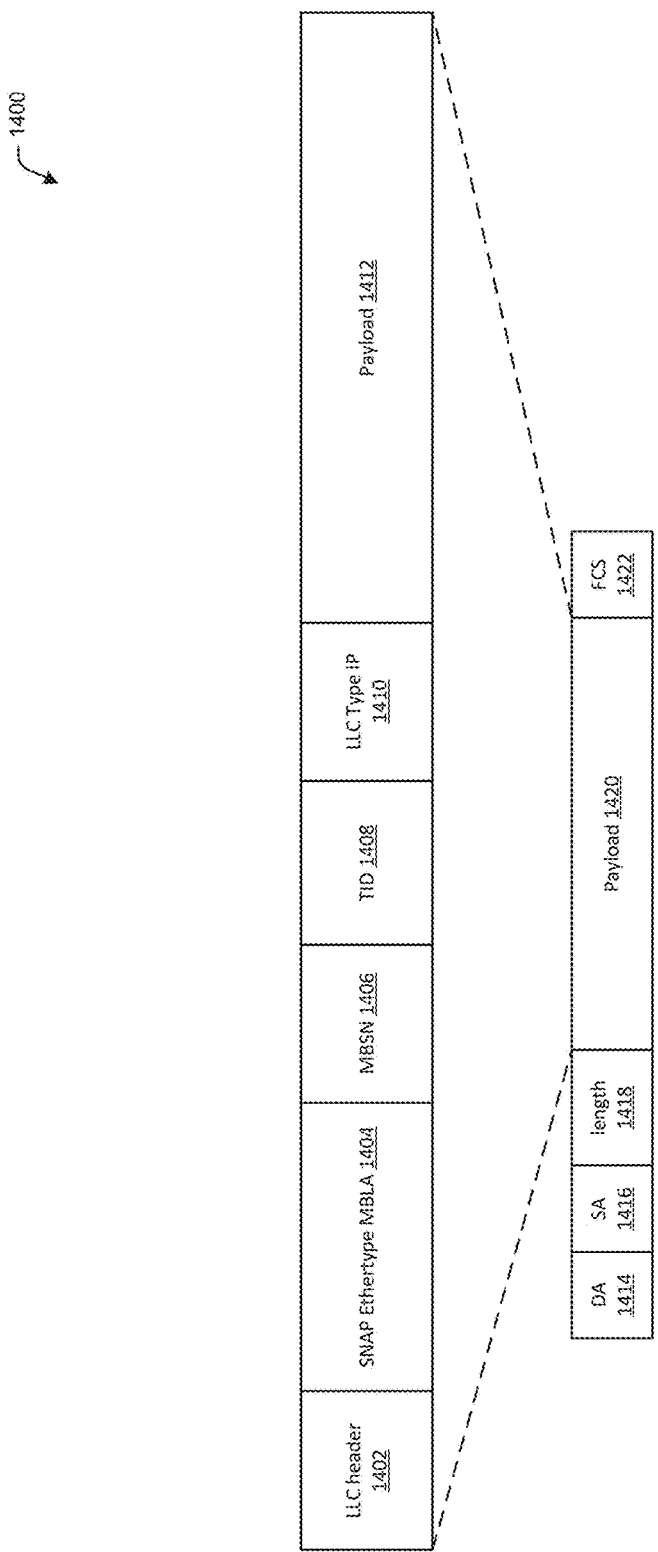

Frame 1400 may be an Ethernet frame comprising a frame such as frame 1100, wherein frame 1400 the payload field of 1100 may be a packet comprising an Ethertype frame. That is, Ethertype frame 1100 may be encapsulated as a packet in frame 1400, and may be transmitted by an access point to a multi-band proxy device which may in turn route the packet in the payload field of the encapsulated frame to the Internet. FIG. 14 depicts fields of a frame, according to one or more example embodiments of the disclosure. Frame 1400 may comprise DA 1414, SA 1416, length 1418, payload 1420, and FCS 1422. DA 1414 may comprise similar information to that in DA 1312, SA 1416 may comprise similar information to that in SA 1314, length 1418 may comprise a plurality of bits indicating the number of bits in payload 1420, and FCS 1422 may comprise similar information to that in FCS 1306, but may be different because the fields proceeding payload 1420 (i.e., DA 1414, SA 1416, and length 1418) may be different than the field proceeding payload 1304 (i.e., MAC header 1302). Accordingly, FCS 1422 may be different than FCS 1406. LLC header 1402 may comprise information similar to that in LLC header 1202, SNAP Ethertype MBLA 1404 may comprise information similar to that in SNAP Ethertype MBLA 1204, MSBN 1406 may comprise similar information to that in MBSN 1206, TID 1208 may comprise similar information to that in TID 1208, LLC Type IP 1410 may comprise similar information to that in LLC Type IP 1210, and Payload 1412 may comprise similar information to that in Payload 1212.

Figure 15:
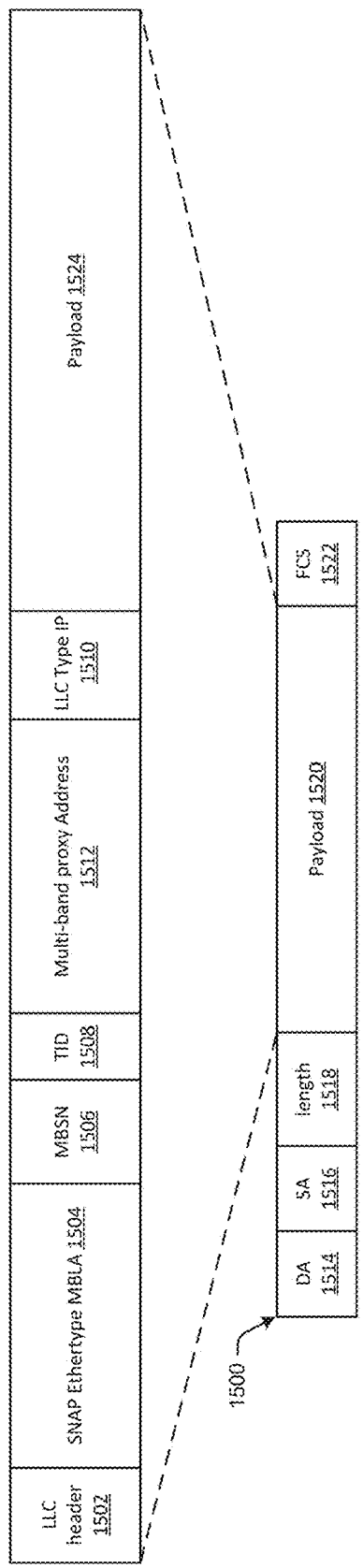

Frame 1500 may be an Ethernet frame comprising a frame such as frame 1100, wherein frame 1500 the payload field of 1100 may be a packet comprising an Ethertype frame. That is, Ethertype frame 1100 may be encapsulated as a packet in frame 1500, and may be transmitted by an access point to a multi-band proxy device which may in turn route the packet in the payload field of the encapsulated frame to the Internet. Frame 1500 may differ from frame 900 in that an address of proxy device 300 is included is appended to the IP packet. FIG. 15 depicts fields of a frame, according to one or more example embodiments of the disclosure. Frame 1500 may comprise DA 1514, SA 1516, length 1518, payload 1520, and FCS 1522. DA 1514 may comprise information similar to that in DA 1414, and SA 1516, may comprise information similar to that in SA 1416. Length 1518 may comprise a plurality of bits indicating the number of bits in payload 1520 and FCS 1522 and may be a FCS number that is calculated by a transmitting device (e.g., AP) based on data in the frame, and in particular payload 1520. The FCS number may be added to the end of a frame that is sent. When a destination device (e.g., proxy device) receives the frame the FCS number is recalculated and compared with the FCS number included in the frame. If the recalculated FCS number is not the same as the FCS number transmitted in the frame, an error is assumed and the frame is discarded. The transmitting device may compute a cyclic redundancy check on the entire frame and append FCS 1522 as a trailer to the data. The receiving destination device may compute the cyclic redundancy check on the frame using the same algorithm used to generate the cyclic redundancy check, and may compare it to FCS 1522. This may enable the receiving device to detect whether any data was lost or altered in transit. In some embodiments, if an error is detected, it may discard the data, and request retransmission of the frame.

In some embodiments, FCS 1522 may be transmitted in such a way that the receiving device can compute a running sum over the entire frame, together with the trailing FCS, expecting to see a fixed result (such as zero) when it is correct. For Ethernet and other IEEE 802 protocols, this fixed result, may be a CRC32 residue. When transmitted and used in this way, FCS 1522 generally appears immediately before a frame-ending delimiter.

Payload 1520 may comprise LLC header 1502, subnetwork access protocol Ethertype multiband link aggregation (SNAP ETHERTYPE MBLA) 1504, multiband sequence number (MBSN) 1506, traffic identifier (TID) 1508, LLC Type IP 1510, multi-band proxy address 1512, and payload 1524. LLC header 1502 may comprise information similar to that in LLC header 1202, SNAP ETHERTYPE MBLA 1504 may comprise information similar to that in SNAP ETHERTYPE MBLA 1204, MBSN 1506 may comprise information similar to that in MBSN 1206, TID 1508 may comprise information similar to that in 1208, LLC Type IP 1510 may comprise information similar to that in LLC Type IP 1210, multi-band proxy address 1512 may comprise information similar to that in multi-band proxy address 1212, and payload 1524 may comprise information similar to that in payload 1214.

Figure 16:
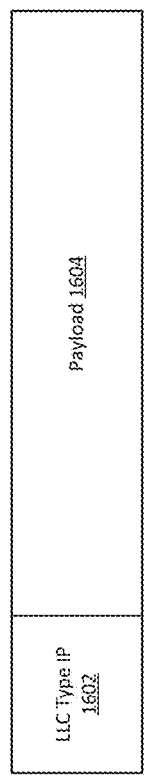

Frame 1600 may be the same frame as frame 1100, and the payload field of frame 1600 may include the same packet as frame 1100. Frame 1600 may be received by multi-band proxy 506 and may be forwarded to the Internet based on a destination address field in the received frame, wherein the received frame is frame 1500. FIG. 16 depicts fields of a frame, according to one or more example embodiments of the disclosure. Frame 1600 may comprise LLC Type IP 1602 may comprise similar information to that in LLC Type IP 1102 and Payload 1604 may comprise similar information to that in payload 1104. As an example, a STA in a wireless client, and in particular UMAC (LA-FST entity) 474, may receive data to be transmitted in frame 1100, from UMLME 468, and traffic steering 470 may determine that frame 1100 should be transmitted via STA 465, and therefore will instruct UMAC (LA-FST entity) 474 to send a signal to MAC 476 to generate frame 600 and to include the data in payload 1104. Before the signal is sent to MAC 476, UMAC (LA-FST entity) 474 may encapsulate LLC Type IP 1102 and Payload 1104 in subsequent frames as illustrated in FIGS. 12 and 13, and then UMCA (LA-FST entity) 747 may then send the signal to MAC 476, which in turn may then send a signal to PHY 484 using one or more primitives provide by PHY SAP 495, and PHY 484 (e.g., a transceiver or transmitter) may transmit frame 1300 comprising frame 1100. An AP (e.g., AP 201) may receive a version of frame 1300 and may recover frame 1100 by removing the encapsulating frames illustrated in FIGS. 12 and 13. AP 200 may receive frame 1300 via PHY 228 and PHY 228 may send a signal to MAC 224 using one or more primitives in PHY SAP 226 and MAC 224 may transmit a signal to UMAC (LA-FST entity) 212 which may decapsulate frame 1300 to recover frame 1100 and may send a signal to UMLME 208 using one or more primitives of MAC SAP 210 where UMLME 208 may inspect LLC Type IP 1104 to determine which Ethernet port to forward the frame out of to reach the destination address recorded in DA 1514.

Figure 17:
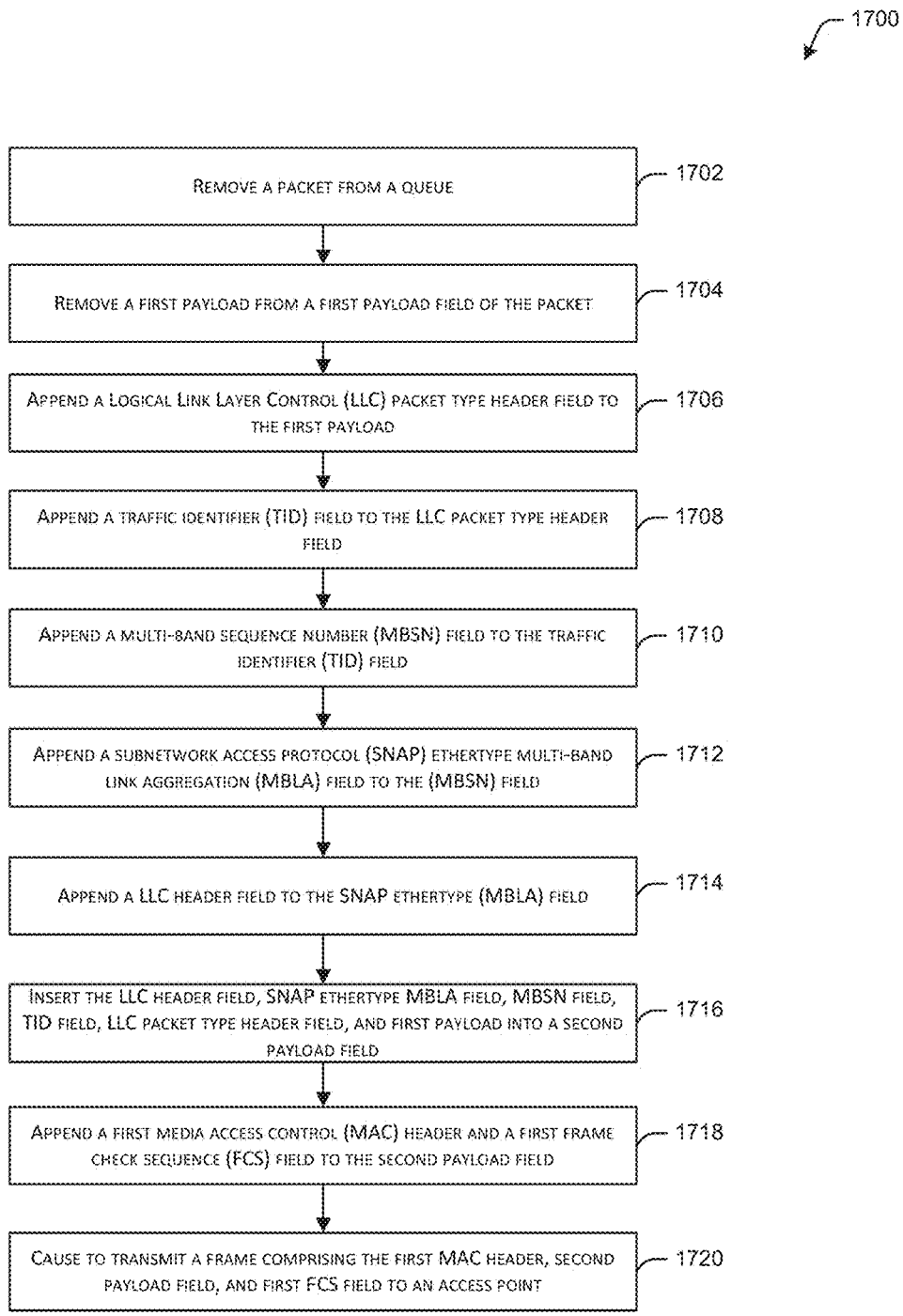
FIG. 17 depicts an illustrative flow diagram for encapsulating a frame, according to one or more example embodiments of the disclosure.
Figure 18:
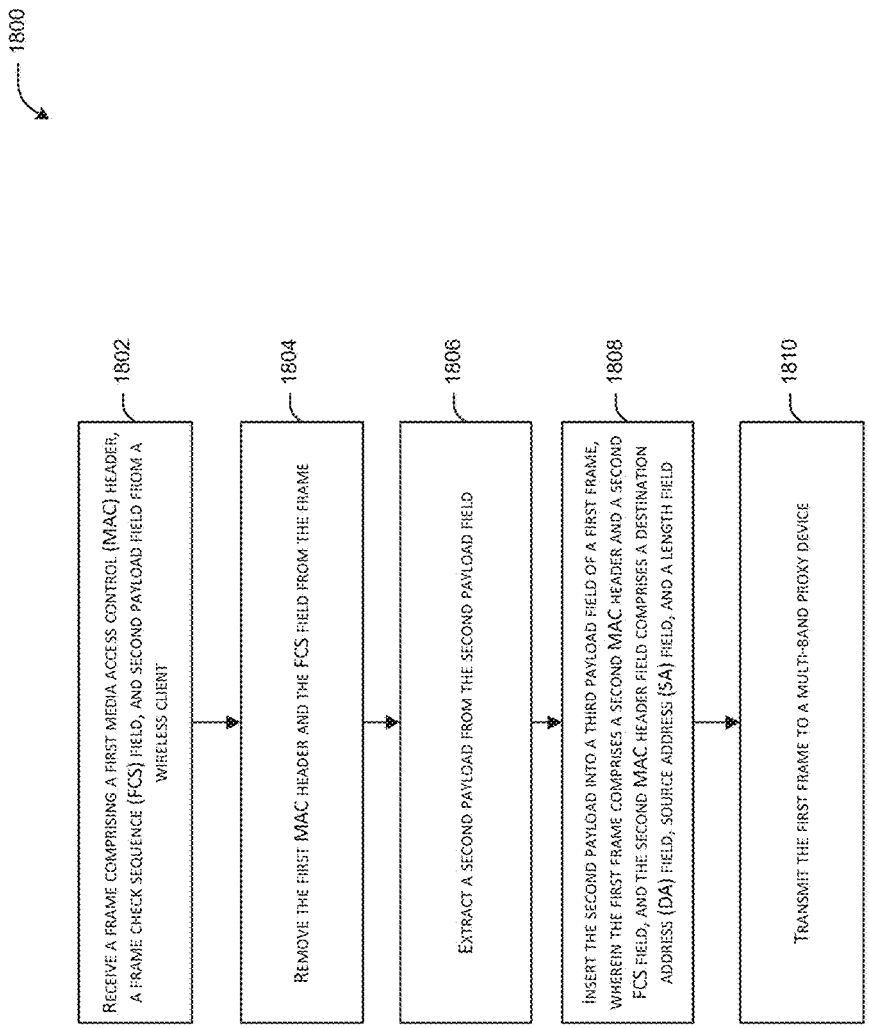
FIG. 18 depicts an illustrative flow diagram for encapsulating a frame, according to the disclosure.
Figure 19:
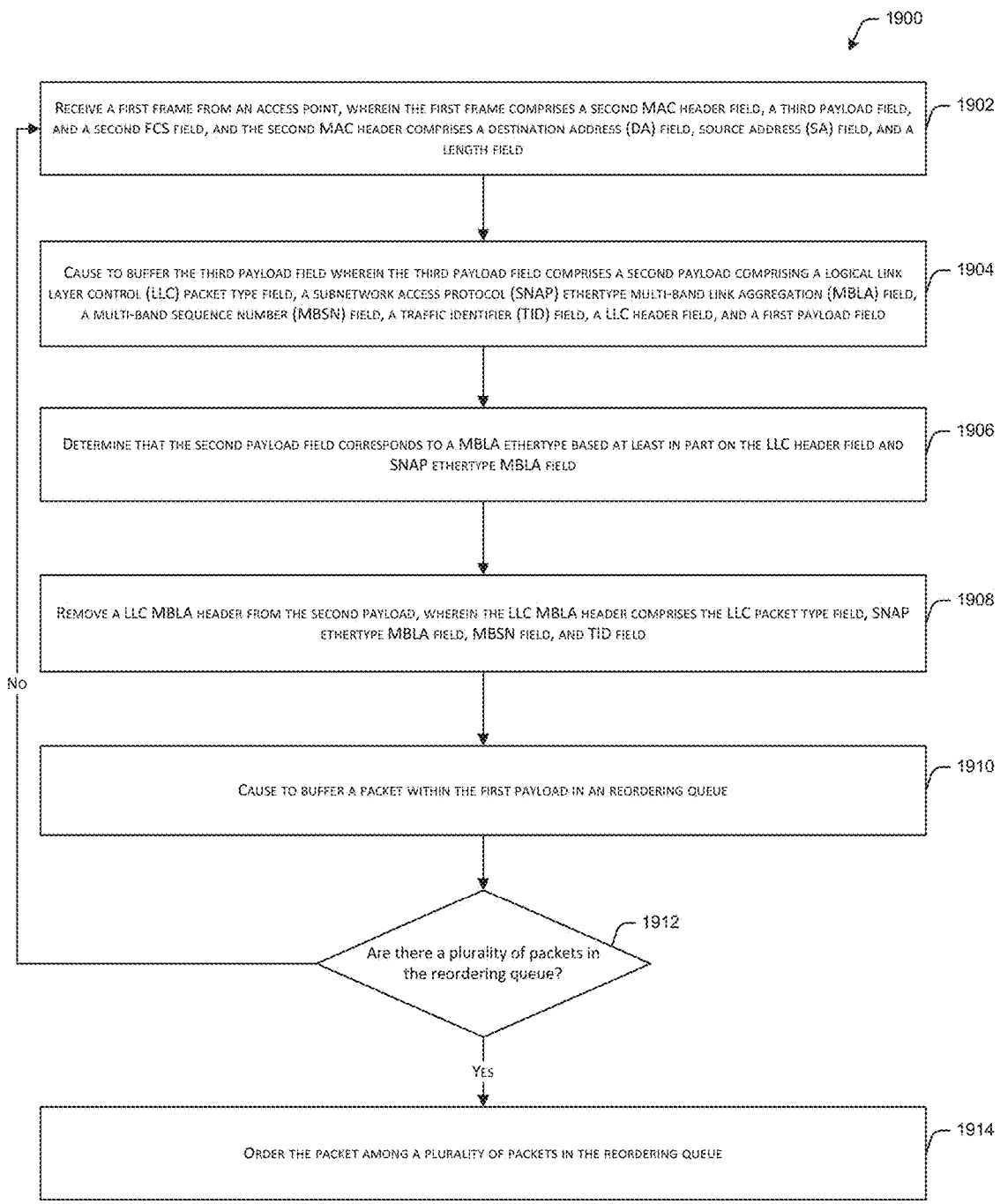
FIG. 19 depicts an illustrative flow diagram for ordering packets, according to the disclosure.

FIGS. 17-19 may correspond to a non-stateless link aggregation method, and the fields in frames 600-1000 may correspond to the fields referenced in FIGS. 17-19.

FIG. 17 depicts an illustrative flow diagram for encapsulating a frame, according to one or more example embodiments of the disclosure. The fields in frames 600-800 may correspond to the frames reference in method 1700. Method 1700 may correspond to a series of steps that may occur in the order depicted in method 1700 or in another order, and may correspond to computer-executable instructions that may be executed by a processor or one or more components in a wireless device, such as wireless device 400. And may include one or more steps performed by UMAC (LA-FST entity) 474. At step 1702, the method may remove a packet from a queue. For example, an application executing on a wireless device such as multiband client 516 may have data to transmit to a server connected to the Internet, and may segment the data into one or more octets that fit into an Internet Protocol (IP) packet that may be encapsulated in an IEEE 802.11 frame as explained below. At step 1704, the method may remove a first payload from a first payload field of the packet. In some embodiments, for example, the first payload field may be removed by UMAC (LA-FST entity) 474. In other embodiments, the first payload from the first payload field of the packet may be removed by a network layer entity and transmitted to UMAC (LA-FST entity) 474. At step 1706, the method may append a logical link layer control (LLC) packet type header field to the first payload. For example, UMAC (LA-FST entity) 474 may append the LLC packet type header field to the first payload. At step 1708, the method may append a traffic identifier (TID) field to the LLC packet type header field. For example, UMAC (LA-FST entity) 474 may append the TID field to the LLC packet type header field. At step 1710, the method may append a multi-band sequence number (MBSN) field to the TID field. For example, UMAC (LA-FST entity) 474 may append the MBSN field to the TID field. At step 1712, the method may append a subnetwork access protocol (SNAP) Ethertype multi-band link aggregation (MBLA) field to the MBSN field. For example, UMAC (LA-FST entity) 474 may append the MBLA field to the MBSN field. At step 1714, the method may append a LLC header field to the SNAP Ethertype MBLA field. For example, UMAC (LA-FST entity) 474 may append the LLC header field to the SNAP Ethertype MBLA field. At step 1716, the method may insert the LLC header field, SNAP Ethertype MBLA field, MBSN field, TID field, LLC packet type header field, and first payload into a second payload field. For example, MAC 476 or MAC 478 may insert the LLC header field, SNAP SNAP Ethertype MBLA field, MBSN field, TID field, LLC packet type header field, and first payload into the second payload field. At step 1718, the method may append a first media access control (MAC) header and a first frame check sequence (FCS) field to the second payload field. For example, MAC 476 or MAC 478 may append the first MAC header and a first FCS field to the second payload field. At step 1720, the method may cause to transmit a frame comprising the first MAC header, second payload field, and first FCS to an access point. For example, MAC 476 or MAC 478 may generate a signal corresponding to the frame and send the signal to PHY 484 or PHY 486 which may in turn transmit an electromagnetic signal to PHY 228 of access point 200 or PHY 258 of access point 201, wherein access point 200 may correspond to AP 508 and access point 201 may correspond to AP 510. After step 1720 the method may end.

FIG. 18 depicts an illustrative flow diagram for encapsulating a frame, according to the disclosure. The fields in frame 900 correspond to the fields referenced in method 1800. AP 508 or AP 510, as mentioned above may comprise one or more components of access points 200 and 201 respectively. Method 1800 may correspond to a series of steps that may occur in the order depicted in method 1800 or in another order, and may correspond to computer-executable instructions that may be executed by a processor or one or more components in a wireless device, such as AP 508 or AP 510. These one or more components may generate signals corresponding to the steps of method 1800 to encapsulate a frame such as frame 700 in payload field 920 of frame 900. In particular, UMAC (LA-FST entity) 212 or UMAC (LA-FST entity) 238 may encapsulate and/or decapsulate frames received from a wireless device such as multiband client 516. Access points 200 and 201, and in particular, PHY 228 and PHY 258 may receive an electromagnetic signal corresponding to the frame to be encapsulated, according to method 1800, from PHY 484 and PHY 486 respectively. At step 1802, the method may receive a frame comprising a first media access control (MAC) header, a frame check sequence (FCS) field, and second payload field from a wireless client. For example, MAC 224 or MAC 254 may receive a signal corresponding to the frame. At step, 1804, the method may remove the first MAC header and the FCS field from the frame. For example, MAC 224 or MAC 254 may remove the first MAC header and the FCS field from the frame. At step 1806, the method may extract a second payload from the second payload field. For example, MAC 224 or MAC 254 may extract the second payload from the second payload field. At step 1808, the method may insert the second payload into a third payload field of a first frame, wherein the first frame comprises a second MAC header and a second FCS field, and the second MAC header field comprises a destination address (DA) field, source address (SA) field, and a length field. For example, MAC 224 or MAC 254 may inset the second payload into the third payload field of the first frame. At step 1810, the method may transmit the first frame to a multi-band proxy device. For example, MAC 224 or MAC 254 may cause PHY 226 or PHY 256, respectively, to transmit a signal corresponding to the first frame. After step 1810, the method may end.

FIG. 19 depicts an illustrative flow diagram for ordering packets, according to the disclosure. The fields in frames 900 and 1000 correspond to the fields referenced in method 1900. Multi-band proxy 506 as mentioned above may comprise one or more of the components or entities of proxy device 300, such as UMAC (LA-FST entity) 312. Method 1900 may correspond to a series of steps that may occur in the order depicted in method 1900 or in another order, and may correspond to computer-executable instructions that may be executed by a processor or one or more components in a wireless device, such as proxy device 500. At step 1902, the method may receive a first frame from an access point, wherein the first frame comprises a second MAC header field, a third payload field, and a second FCS field, and the second MAC header comprises a destination address (DA) field, source address (SA) field, and a length field. For example, UMAC (LA-FST entity) 312 may receive the first frame from the access point (e.g., AP 508 or ap 510). In particular, UMAC (LA-FST entity) 312 may receive the first frame from UMAC (LA-FST entity) 212 or UMAC (LA-FST entity) 238. At step 1904, the method may cause the proxy device to buffer the third payload field wherein the third payload field comprises a second payload comprising a logical link layer control (LLC) packet type field, a subnetwork access protocol (SNAP) Ethertype multi-band link aggregation (MBLA) field, a multi-band sequence number (MBSN) field, a traffic identifier (TID) field, a LLC header field, and a first payload field. For example, UMLME 324 may receive a signal corresponding to the third payload field and store the third payload field in buffering entity 316. At step 1906, the method may determine that the second payload field corresponds to a MBLA Ethertype based at least in part on the LLC header field and SNAP Ethertype MBLA field. UMAC (LA-FST entity) 312 may determine that the second payload field corresponds to the MBLA Ethertype based on the LLC header field and SNAP Ethertype MBLA field. At step 1908, the method may remove a LLC MBLA header from the second payload, wherein the LLC MBLA header comprises the LLC packet type field, SNAP Ethertype MBLA field, MBSN field, and TID field. A media access control (MAC) layer of proxy device 300 (not shown), which may correspond to multi-band proxy device 506, may remove the LLC MBLA header from the second payload. At step 1910, the method may cause the proxy device to buffer a packet within the first payload in a reordering queue. For example, UMAC (LA-FST entity) 312 may store the first payload in Buffering/Reordering entity 320. At step 1912, the method may determine if there is a plurality of packets in the reordering queue. For example, UMAC (LA-FST entity) 312 may determine if the is a plurality of packets in the reordering queue. If the method determines that there is a plurality of packets in the reordering queue, the method may progress to step 1914 and may order the packet among the plurality of packets in the reordering queue. For example, UMAC (LA-FST entity) 312 may determine that there is a plurality of packets in the queue which may cause Buffering/Reordering entity 320 to order or reorder the packets of the plurality of packets. For example, Buffering/Reordering entity 320 may receive packets from STA 512 via AP 508 corresponding to packets associated with a first flow of packets and a first QoS, and may receive packets from STA 514 via AP 510 corresponding to packets associated with a second flow of packets and a second QoS. And the packets of the first flow of packets may be received interspersed with packets for the second flow of packets, thereby requiring Buffering/Reordering entity 320 to reorder the packets so that packets of the first flow are transmitted to a corresponding first Internet entity and packets of the second flow are transmitted to a corresponding second Internet entity. For instance, if the first QoS corresponds to an application executing on multiband client 516 that requires that the exchange of packets between multiband client 516 and a server connected to multi-band proxy 506 via the Internet be delivered to their intended destination with a latency that does not exceed a certain threshold, then Buffering/Reordering entity 320 may order these packets before packets associated with the second QoS if the packets associated with the second QoS can be delivered to their intended destination with a latency that greater than the threshold. Buffering/Reordering entity 320 may determine which flow a packet belongs to based at least in part on the TID field appended to the frame carrying the packet, and may determine the order or sequence of packets based at least in part on the MBSN. For instance, a MBSN in the MBSN field and a TID in the TID field may be used to determine how packets should be ordered according to different flows. For example, the TID may identify a flow and the MSBN may be used by Buffering/Reordering entity 320 to determine an order in which received packets should be transmitted to their intended destination. Take for instance that two packets, with the same TID, arrive and the first packet has a MBSN that is greater than the MBSN of the second packet, then Buffering/Reordering entity 320 may buffer the first packet, transmit the second packet to its intended destination, remove the first packet from the buffer and transmit the first packet the same destination since the packets belong to the same flow, or have the same TID. If the method determines that there is not a plurality of packets in the reordering queue, the method may return to step 1902. After step 1914 the method may end.

Figure 20:
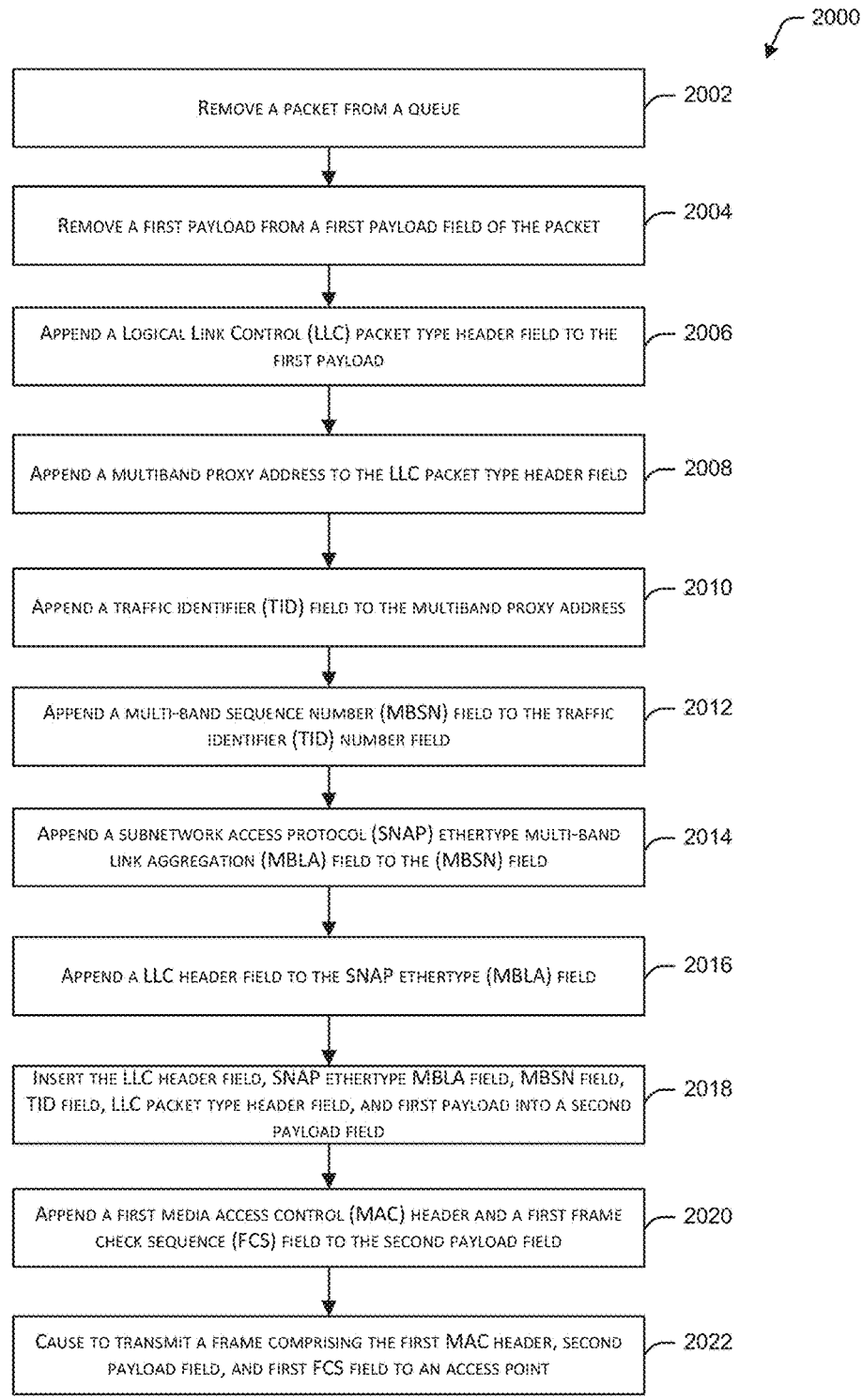
FIG. 20 depicts an illustrative flow diagram for encapsulating a frame, according to one or more example embodiments of the disclosure.
Figure 21:
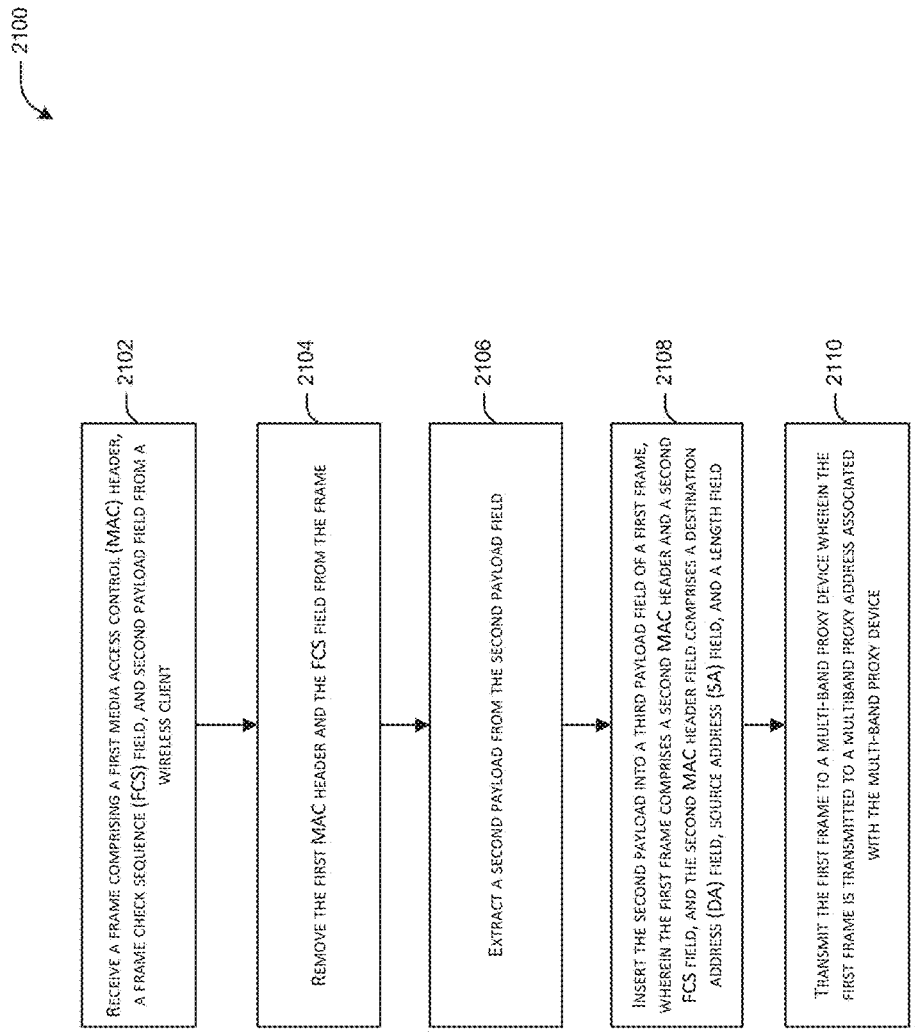
FIG. 21 depicts an illustrative flow diagram for encapsulating a frame, according to one or more example embodiments of the disclosure.
Figure 22:
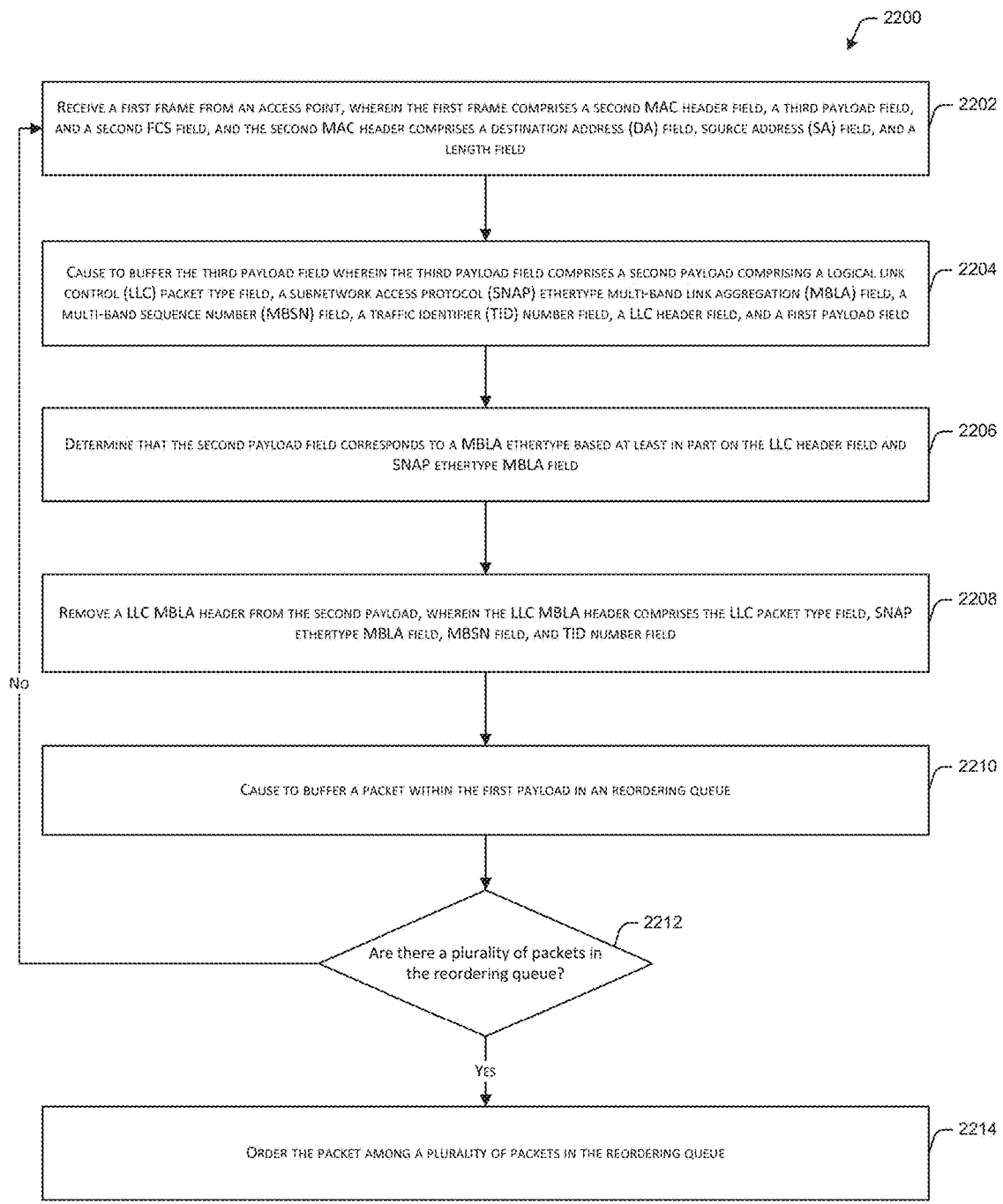
FIG. 22 depicts an illustrative flow diagram for ordering packets, according to the disclosure.

FIGS. 20-22 may correspond to a stateless link aggregation method, and the fields in frames 1100-1600 may correspond to the fields referenced in FIGS. 17-19.

FIG. 20 depicts an illustrative flow diagram for encapsulating a frame, according to one or more example embodiments of the disclosure. Method 2000 may correspond to a series of steps that may occur in the order depicted in method 2000 or in another order, and may correspond to computer-executable instructions that may be executed by a processor or one or more components in a wireless device, such as wireless device 400. And may include one or more steps performed by UMAC (LA-FST entity) 474. The fields in frames 1100-1300 correspond to the fields referenced in method 2000. At step 2002, the method may remove a packet from a queue. For example, an application executing on a wireless device such as multiband client 516 may have data to transmit to a server connected to the Internet, and may segment the data into one or more octets that fit into an Internet Protocol (IP) packet that may be encapsulated in an IEEE 802.11 frame as explained below. At step 2004, the method may remove a first payload from a first payload field of the packet (e.g., payload 1104 may be an IP packet). In some embodiments, for example, the first payload field may be removed by UMAC (LA-FST entity) 474. In other embodiments, the first payload from the first payload field of the packet may be removed by a network layer entity and transmitted to UMAC (LA-FST entity) 474. At step 2006, the method may append a logical link layer control (LLC) packet type header field to the first payload. For example, UMAC (LA-FST entity) 474 may append the LLC packet type header field to the first payload. At step 2008, the method may append a multiband proxy address to the LLC packet type header field. For example, a network layer entity in the wireless device may append the multiband proxy address to the LLC packet type header field. At step 2010, the method may append a traffic identifier (TID) field to the multiband proxy address field. For example, UMAC (LA-FST entity) 474 may append the TID field to the multiband proxy address field. At step 2012, the method may append a multi-band sequence number (MBSN) field to the traffic identifier field. For example, UMAC (LA-FST entity) 474 may append the MBSN field to the TID field. At step 2014, the method may append a subnetwork access protocol (SNAP) Ethertype multi-band link aggregation (MBLA) field to the MBSN field. For example, UMAC (LA-FST entity) 474 may append the SNAP Ethertype MBLA field to the MBSN field. At step 2016, the method may append a LLC header field to the SNAP Ethertype MBLA field. UMAC (LA-FST entity) 474 may append the LLC header field to the SNAP Ethertype MBLA field. At step 2018, the method may insert the LLC header field, SNAP Ethertype MBLA field, MBSN field, TID field, LLC packet type header field, and first payload into a second payload field. For example, UMAC (LA-FST entity) 474 may append the LLC header field, SNAP Ethertype MBLA field, MBSN field, TID field, LLC packet type header field, and first payload into the second payload field. At step 2020, the method may append a first media access control (MAC) header and a first frame check sequence (FCS) field to the second payload field. For example, UMAC (LA-FST entity) 474 may append the first MAC header and the first FCS field to the second payload field. At step 2022, the method may cause to transmit a frame comprising the first MAC header, second payload field, and first FCS to an access point. For example, MAC 476 or MAC 478 may generate a signal corresponding to the frame and send the signal to PHY 484 or PHY 486 which may in turn transmit an electromagnetic signal to PHY 228 of access point 200 or PHY 258 of access point 201, wherein access point 200 may correspond to AP 508 and access point 201 may correspond to AP 510. After step 2022 the method may end.

FIG. 21 depicts an illustrative flow diagram for encapsulating a frame, according to the disclosure. The fields of frames 1400 and 1500 correspond to the frames referenced in method 2100. Method 2100 may correspond to a series of steps that may occur in the order depicted in method 2100 or in another order, and may correspond to computer-executable instructions that may be executed by a processor or one or more components in a wireless device, such as AP 508 or AP 510. These one or more components may generate signals corresponding to the steps of method 2100 to encapsulate a frame such as frame 1200 in payload field 1520 of frame 1500. In particular, UMAC (LA-FST entity) 212 or UMAC (LA-FST entity) 238 may encapsulate and/or decapsulate frames received from a wireless device such as multiband client 516. Access points 200 and 201, and in particular, PHY 228 and PHY 258 may receive an electromagnetic signal corresponding to the frame to be encapsulated, according to method 1800, from PHY 484 and PHY 486 respectively. At step 2102, the method may receive a frame comprising a first media access control (MAC) header, a frame check sequence (FCS) field, and second payload field from a wireless client. For example, MAC 224 or MAC 254 may receive a signal corresponding to the frame. At step, 2104, the method may remove the first MAC header and the FCS field from the frame. For example, MAC 224 or MAC 254 may remove the first MAC header and the FCS field from the frame. At step 2106, the method may extract a second payload from the second payload field. For example, UMAC (LA-FST entity) 212 or UMAC (LA-FST entity) 238 may extract the second payload from the second payload field, and UMAC (LA-FST entity) 212 or UMAC (LA-FST entity) 238 may extract multi-band proxy address 1212 from frame 1200 which is encapsulated in payload 1520 and transfer multi-band proxy address 1212 to a network entity in access point 200 or access point 201, respectively, so that the network entities in either access point 200 or access point 201 can determine which interface access point 200 or access point 201 should forward the frame out of based on an network layer routing table. For example, the network layer entity of access point 200 or access point 201 may determine an interface that frame 1500 should be forwarded out of based on a routing decision made by the network entity. For instance, the network table may determine that for multi-band proxy address 1212 that a certain interface should be used by MAC 224 or MAC 254 to forward frame 1500 out of. If the network layer entity receives another frame with a different multi-band proxy address, the network entities may determine that another interface should be used to forward the frame out of. At step 2108, the method may insert the second payload into a third payload field of a first frame, wherein the first frame comprises a second MAC header and a second FCS field, and the second MAC header field comprises a destination address (DA) field, source address (SA) field, and a length field. At step 2110, the method may transmit the first frame to a multi-band proxy device, wherein the first frame is transmitted to a multiband proxy address associated with the multi-band proxy device. For example, UMAC (LA-FST entity) 212 or UMAC (LA-FST entity) 238 may insert the second payload into the third payload field of the first frame. After step 2110, the method may end.

FIG. 22 depicts an illustrative flow diagram for ordering packets, according to the disclosure. The fields in frames 1500 and 1600 correspond to the fields referenced in method 2200. Multi-band proxy 506 as mentioned above may comprise one or more of the components or entities of proxy device 300, such as UMAC (LA-FST entity) 312. Method 2200 may correspond to a series of steps that may occur in the order depicted in method 2200 or in another order, and may correspond to computer-executable instructions that may be executed by a processor or one or more components in a wireless device, such as proxy device 500. At step 2202, the method may receive a first frame from an access point, wherein the first frame comprises a second MAC header field, a third payload field, and a second FCS field, and the second MAC header comprises a destination address (DA) field, source address (SA) field, and a length field. At step 2204, the method may cause the proxy device to buffer the third payload field wherein the third payload field comprises a second payload comprising a logical link layer control (LLC) packet type field, a subnetwork access protocol (SNAP) Ethertype multi-band link aggregation (MBLA) field, a multi-band sequence number (MBSN) field, a traffic identifier (TID) field, a LLC header field, and a first payload field. For example, UMAC (LA-FST entity) 312 may receive the first frame from the access point (e.g., AP 508 or ap 510). In particular, UMAC (LA-FST entity) 312 may receive the first frame from UMAC (LA-FST entity) 212 or UMAC (LA-FST entity) 238. At step 2206, the method may determine that the second payload field corresponds to a MBLA Ethertype based at least in part on the LLC header field and SNAP Ethertype MBLA field. For example, UMAC (LA-FST entity) 312 may determine that the second payload field corresponds to the MBLA Ethertype, based on the LLC header field and SNAP Ethertype MBLA field. At step 2208, the method may remove a LLC MBLA header from the second payload, wherein the LLC MBLA header comprises the LLC packet type field, SNAP Ethertype MBLA field, MBSN field, and TID field. For example, UMAC (LA-FST entity) 312 may remove the LLC MBLA header from the second payload. At step 2210, the method may cause the proxy device to buffer a packet within the first payload in a reordering queue. For example, UMAC (LA-FST entity) 312 may store the first payload in Buffering/Reordering entity 320. At step 2212, the method may determine if there is a plurality of packets in the reordering queue. For example, UMAC (LA-FST entity) 312 may determine if the is a plurality of packets in the reordering queue. If the method determines that there is a plurality of packets in the reordering queue, the method may progress to step 2214 and may order the packet among the plurality of packets in the reordering queue. For example, UMAC (LA-FST entity) 312 may determine if the is a plurality of packets in the reordering queue. For example, UMAC (LA-FST entity) 312 may determine that there is a plurality of packets in the queue which may cause Buffering/Reordering entity 320 to order or reorder the packets of the plurality of packets. For example, Buffering/Reordering entity 320 may receive packets from STA 512 via AP 508 corresponding to packets associated with a first flow of packets and a first QoS, and may receive packets from STA 514 via AP 510 corresponding to packets associated with a second flow of packets and a second QoS. And the packets of the first flow of packets may be received interspersed with packets for the second flow of packets, thereby requiring Buffering/Reordering entity 320 to reorder the packets so that packets of the first flow are transmitted to a corresponding first Internet entity and packets of the second flow are transmitted to a corresponding second Internet entity. For instance, if the first QoS corresponds to an application executing on multiband client 516 that requires that the exchange of packets between multiband client 516 and a server connected to multi-band proxy 506 via the Internet be delivered to their intended destination with a latency that does not exceed a certain threshold, then Buffering/Reordering entity 320 may order these packets before packets associated with the second QoS if the packets associated with the second QoS can be delivered to their intended destination with a latency that greater than the threshold. Buffering/Reordering entity 320 may determine which flow a packet belongs to based at least in part on the TID field appended to the frame carrying the packet, and may determine the order or sequence of packets based at least in part on the MBSN. For instance, a MBSN in the MBSN field and a TID in the TID field may be used to determine how packets should be ordered according to different flows. For example, the TID may identify a flow and the MSBN may be used by Buffering/Reordering entity 320 to determine an order in which received packets should be transmitted to their intended destination. Take for instance that two packets, with the same TID, arrive and the first packet has a MBSN that is greater than the MBSN of the second packet, then Buffering/Reordering entity 320 may buffer the first packet, transmit the second packet to its intended destination, remove the first packet from the buffer and transmit the first packet the same destination since the packets belong to the same flow, or have the same TID. If the method determines that there is not a plurality of packets in the reordering queue, the method may return to step 2202. After step 2214 the method may end.

Figure 23:
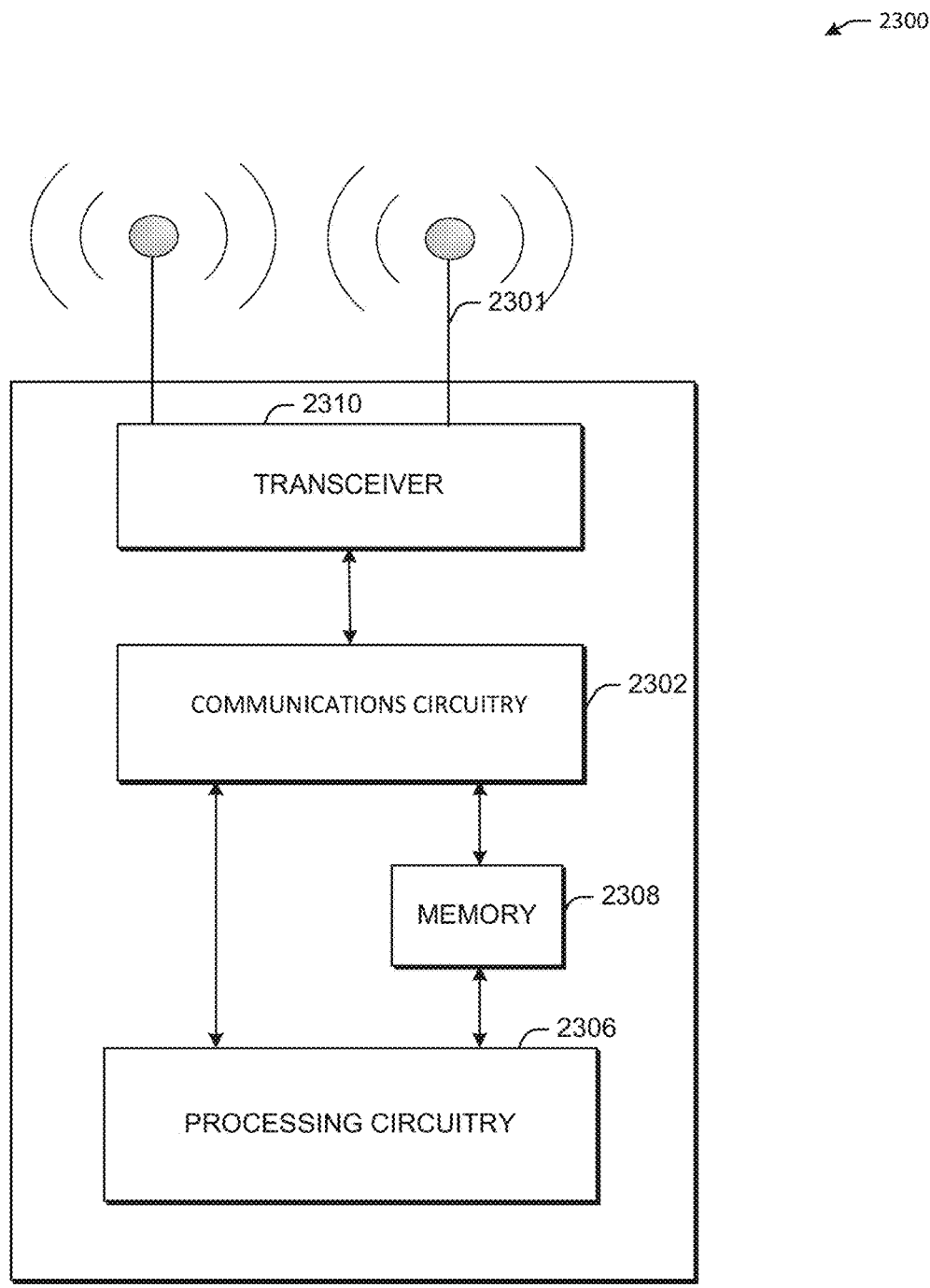
FIG. 23 illustrates a functional diagram of an example communication station that may be suitable for use as a user device, in accordance with one or more example embodiments of the disclosure.

FIG. 23 shows a functional diagram of an exemplary communication station 2300 in accordance with some embodiments. In one embodiment, FIG. 23 illustrates a functional block diagram of a communication station that may be suitable for use as an AP (e.g., APs 102, 104, 108, 110) in FIG. 1 or at least one user device (e.g., user device 114) in FIG. 1 in accordance with some embodiments. The communication station 2300 may also be suitable for use as a handheld device, mobile device, cellular telephone, smartphone, tablet, netbook, wireless terminal, laptop computer, wearable computer device, femtocell, HiGH Data Rate (HDR) subscriber station, access point, access terminal, or other personal communication system (PCS) device.

The communication station 2300 may include communications circuitry 2302 and a transceiver 2310 for transmitting and receiving signals to and from other communication stations using one or more antennas 2301. The communications circuitry 2302 may include circuitry that can operate the physical layer communications and/or medium access control (MAC) communications for controlling access to the wireless medium, and/or any other communications layers for transmitting and receiving signals. For example, communications circuitry 2302 may comprise one or more components of access points 200 or 201 for an access point such as access points 200 or 201. Communications circuitry 2302 may comprise one or more components of proxy device 300, for a proxy device such as proxy device 300. Communications circuitry 2302 may comprise one or more components of wireless device 400, for a wireless device such as wireless device 400. The communication station 2300 may also include processing circuitry 2306 and memory 2308 arranged to perform the operations described herein. In some embodiments, the communications circuitry 2302 and the processing circuitry 2306 may be configured to perform operations detailed in FIGS. 17-22.

In accordance with some embodiments, the communications circuitry 2302 may be arranged to contend for a wireless medium and configure frames or packets for communicating over the wireless medium. The communications circuitry 2302 may be arranged to transmit and receive signals. The communications circuitry 2302 may also include circuitry for modulation/demodulation, upconversion/downconversion, filtering, amplification, etc. In some embodiments, the processing circuitry 2306 of the communication station 2300 may include one or more processors. In other embodiments, two or more antennas 2301 may be coupled to the communications circuitry 2302 arranged for sending and receiving signals. The memory 2308 may store information for configuring the processing circuitry 2306 to perform operations for configuring and transmitting message frames and performing the various operations described herein. The memory 2308 may include any type of memory, including non-transitory memory, for storing information in a form readable by a machine (for example, a computer). For example, the memory 2308 may include a computer-readable storage device may, read-only memory (ROM), random-access memory (RAM), magnetic disk storage media, optical storage media, flash-memory devices and other storage devices and media. Proxy device 300 may include a memory like memory 2308, and therefore one or more pools of memory may be used to buffer packets in buffering entity 316. That is buffering entity 316 may be implemented over one or more pools of memory in memory 2308.

In some embodiments, the communication station 2300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (for example, a heart rate monitor, a blood pressure monitor, etc.), a wearable computer device, or another device that may receive and/or transmit information wirelessly.

In some embodiments, the communication station 2300 may include one or more antennas 2301. The antennas 2301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 2300 may include one or more of a keyboard, a display, a non-volatile memory port, multiple antennas, a graphics processor, an application processor, speakers, and other mobile device elements. The display may be an LCD screen including a touch screen.

Although the communication station 2300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 2300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (for example, a computer). For example, a computer-readable storage device may include read-only memory (ROM), random-access memory (RAM), magnetic disk storage media, optical storage media, flash-memory devices, and other storage devices and media. In some embodiments, the communication station 2300 may include one or more processors and may be configured with instructions stored on a computer-readable storage device memory.

Figure 24:
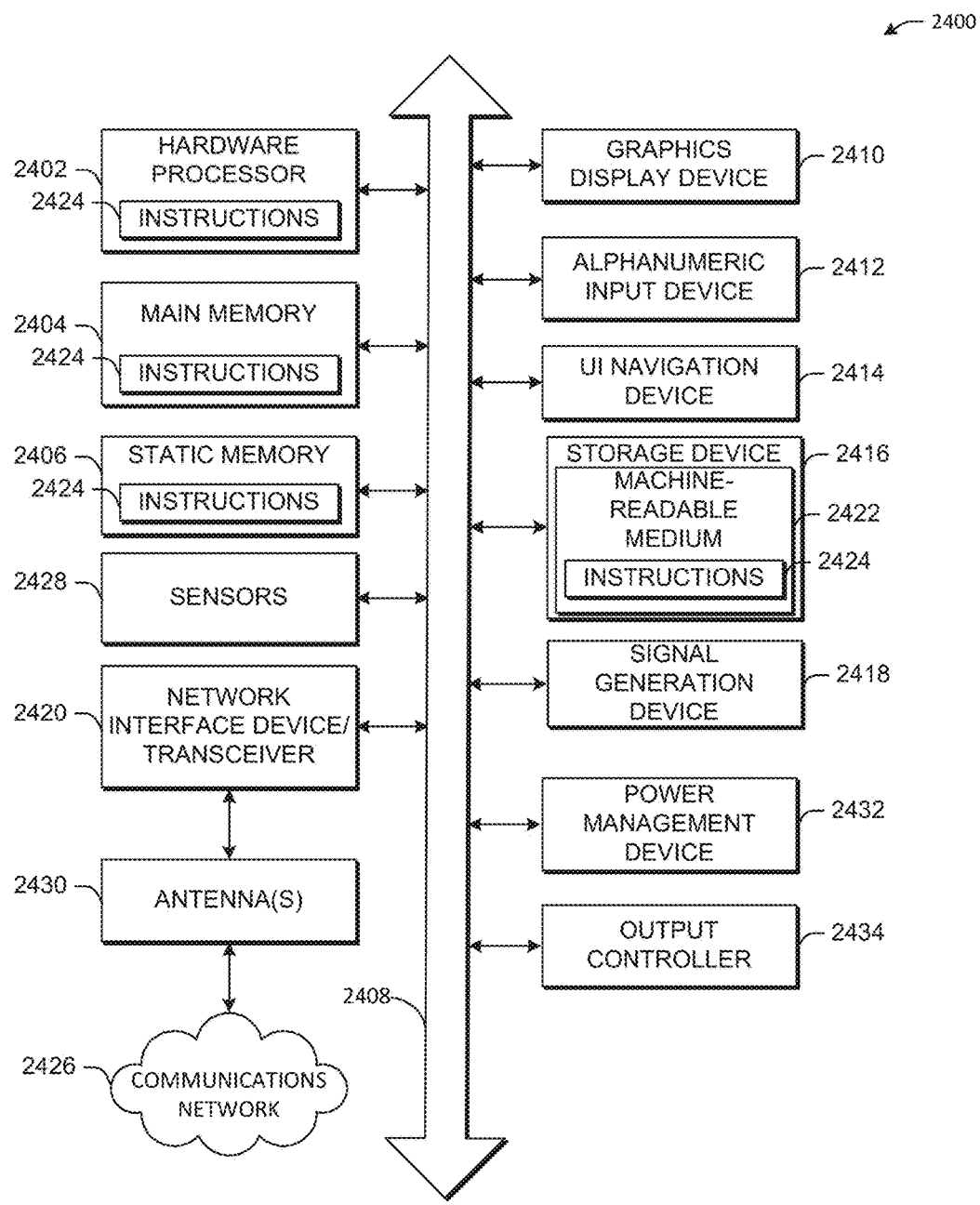
FIG. 24 is a block diagram of an example machine upon which any of one or more techniques (for example, methods) may be performed, in accordance with one or more embodiments of the disclosure.

FIG. 24 illustrates a block diagram of an example of a machine 2400 or system upon which any one or more of the techniques (for example, methodologies) discussed herein may be performed. In other embodiments, the machine 2400 may operate as a standalone device or may be connected (for example, networked) to other machines. In a networked deployment, the machine 2400 may operate in the capacity of a server machine, a client machine, or both in server-client network environments. In an example, the machine 2400 may act as a peer machine in peer-to-peer (P2P) (or other distributed) network environments. The machine 2400 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (for example, hardware) capable of performing specified operations when operating. A module includes hardware. In an example, the hardware may be specifically configured to carry out a specific operation (for example, hardwired). In another example, the hardware may include configurable execution units (for example, transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (for example, computer system) 2400 may include a hardware processor 2402 (for example, a central processing unit (CPU), a graphics processing unit (GPU), a hardware processor core, or any combination thereof), a main memory 2404 and a static memory 2406, some or all of which may communicate with each other via an interlink (for example, bus) 2408. The machine 2400 may further include a power management device 2432, a graphics display device 2410, an alphanumeric input device 2412 (for example, a keyboard), and a user interface (UI) navigation device 2414 (for example, a mouse). In an example, the graphics display device 2410, alphanumeric input device 2412, and UI navigation device 2414 may be a touch screen display. The machine 2400 may additionally include a storage device (i.e., drive unit) 2416, a signal generation device 2418 (for example, a speaker), an aggregation and enhanced transmission of small packets device 2419, a network interface device/transceiver 2420 coupled to antenna(s) 2430, and one or more sensors 2428, such as a global positioning system (GPS) sensor, compass, accelerometer, or other sensor. The machine 2400 may include an output controller 2434, such as a serial (for example, universal serial bus (USB), parallel, or other wired or wireless (for example, infrared (IR), near field communication (NFC), etc.) connection to communicate with or control one or more peripheral devices (for example, a printer, card reader, etc.)).

The storage device 2416 may include a machine readable medium 2422 on which is stored one or more sets of data structures or instructions 2424 (for example, software) embodying or utilized by any one or more of the techniques or functions described herein. The instructions 2424 may also reside, completely or at least partially, within the main memory 2404, within the static memory 2406, or within the hardware processor 2402 during execution thereof by the machine 2400. In an example, one or any combination of the hardware processor 2402, the main memory 2404, the static memory 2406, or the storage device 2416 may constitute machine-readable media.

The instructions 2424 may carry out or perform any of the operations and processes (for example, processes 300-1300) described and shown above. While the machine-readable medium 2422 is illustrated as a single medium, the term "machine-readable medium" may include a single medium or multiple media (for example, a centralized or distributed database, and/or associated caches and servers) configured to store the one or more instructions 2424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 2400 and that cause the machine 2400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (for example, Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2424 may further be transmitted or received over a communications network 2426 using a transmission medium via the network interface device/transceiver 2420 utilizing any one of a number of transfer protocols (for example, frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (for example, the Internet), mobile telephone networks (for example, cellular networks), Plain Old Telephone (POTS) networks, wireless data networks (for example, Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 2420 may include one or more physical jacks (for example, Ethernet, coaxial, or phone jacks) or one or more antennas to connect to the communications network 2426. In an example, the network interface device/transceiver 2420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 2400 and includes digital or analog communications signals or other intangible media to facilitate communication of such software. The operations and processes (for example, processes 600-900) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, HiGH Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, for example, a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), time-Division Multiplexing (TDM), time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced. Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

In example embodiments of the disclosure, there may be a device, comprising a memory and processing circuitry configured to: identify a frame received from an access point, wherein the frame comprises a media access control (MAC) header field, a frame check sequence (FCS) field, and a payload field; cause to buffer the payload field; determine that a first payload, in a first payload field, corresponds to a multiband link aggregation (MBLA) Ethertype based at least in part on a logical link layer controller (LLC) field and a subnetwork access protocol (SNAP) Ethertype MBLA field in the first payload, wherein the first payload is within the payload field; cause to remove a LLC MBLA header field from the first payload field; cause to buffer a packet in a reordering queue, wherein the packet is in a second payload field that is in the first payload field; and order the packet among a plurality of packets in the reordering queue.

Implementations may include the following features. The MAC header field may further comprise a destination address (DA) field and source address (SA) field. The first payload may further comprise a multi-band proxy address. The first payload may further comprise a multiband sequence number (MBSN) field and a traffic identifier (TID) field. The order of the packet among the plurality of packets in the reordering queue may be based at least in part on the MBSN field. The processing circuitry may be further configured to determine a traffic flow based at least in part on the TID field. The processing circuitry may be further configured to determine a quality of service (QoS) based at least in part on the TID field. The processing circuitry may be further configured to determine that the access point is using a non-stateless link aggregation method. The device may further comprise at least one transceiver. The device may further comprise at least one antenna coupled to the at least one transceiver, wherein the at least on transceiver operates at 5 GHz or 60 GHz.

In some example embodiments of this disclosure, there may be a non-transitory computer-readable medium storing computer-executable instructions which, when executed by a processor, may cause the processor to perform operations comprising: identifying a frame received from an access point, wherein the frame comprises a media access control (MAC) header field, a frame check sequence (FCS) field, and a payload field; causing to buffer the payload field; determining that a first payload, in a first payload field, correspond to a multiband link aggregation (MBLA) Ethertype based at least in part on a logical link layer controller (LLC) field and a subnetwork access protocol (SNAP) Ethertype MBLA field in the first payload, wherein the first payload is within the payload field; causing to remove a LLC MBLA header field from the first payload field; causing to buffer a packet in a reordering queue, wherein the packet is in a second payload field that is in the first payload field; and ordering the packet among a plurality of packets in the reordering queue.

Implementations may include the following features. The MAC header field may further comprise a destination (DA) field and a source address (SA) field. The first payload may further comprise a multi-band proxy address. The first payload may further comprise a multiband sequence number (MBSN) field and a traffic identifier (TID) field. The ordering of the packet among the plurality of packets in the ordering queue may be based at least in part on the MBSN field. The processor may be further configured to perform operations comprising determining a traffic flow based at least in part on the TID. The processor may be further configured to perform operations comprising determining that the access point is using a non-stateless link aggregation method.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising:
   memory and processing circuitry configured to:
   identify a frame received from an access point, wherein the frame comprises a media access control (MAC) header field, a frame check sequence (FCS) field, and a payload field;
   cause to buffer the payload field;
   determine that a first payload, in a first payload field, corresponds to a multiband link aggregation (MBLA) Ethertype based at least in part on a logical link layer controller (LLC) field and a subnetwork access protocol (SNAP) Ethertype MBLA field in the first payload, wherein the first payload is within the payload field;
   cause to remove a LLC MBLA header field from the first payload field;
   cause to buffer a packet in a reordering queue, wherein the packet is in a second payload field that is in the first payload field; and
   order the packet among a plurality of packets in the reordering queue.

2. The device of claim 1, wherein the MAC header field further comprises a destination address (DA) field and source address (SA) field.

3. The device of claim 1, wherein the first payload further comprises a multi-band proxy address.

4. The device of claim 1, wherein the first payload further comprises a multiband sequence number (MBSN) field and a traffic identifier (TID) field.

5. The device of claim 4, wherein the
order of the packet among the plurality of packets in the reordering queue is based at least in part on the MBSN field.

6. The device of claim 4, wherein the processing circuitry is further configured to:
determine a traffic flow based at least in part on the TID field.

7. The device of claim 4, wherein the processing circuitry is further configured to:
determine a quality of service (QoS) based at least in part on the TID field.

8. The device of claim 3, wherein the processing circuitry is further configured to:
determine that the access point is using a non-stateless link aggregation method.

9. The device of claim 1, further comprising at least one transceiver.

10. The device of claim 9, further comprising at least one antenna coupled to the at least one transceiver, wherein the at least one transceiver operates at 5 GHz or 60 GHz.

11. A non-transitory computer-readable medium storing computer-executable instructions which, when executed by a processor, cause the processor to perform operations comprising:
identifying a frame received from an access point, wherein the frame comprises a media access control (MAC) header field, a frame check sequence (FCS) field, and a payload field;
causing to buffer the payload field;
determining that a first payload, in a first payload field, correspond to a multiband link aggregation (MBLA) Ethertype based at least in part on a logical link layer controller (LLC) field and a subnetwork access protocol (SNAP) Ethertype MBLA field in the first payload, wherein the first payload is within the payload field;
causing to remove a LLC MBLA header field from the first payload field;
causing to buffer a packet in a reordering queue, wherein the packet is in a second payload field that is in the first payload field; and
ordering the packet among a plurality of packets in the reordering queue.

12. The non-transitory computer-readable medium of claim 11, wherein the MAC header field further comprises a destination address (DA) field and a source address (SA) field.

13. The non-transitory computer-readable medium of claim 11, wherein the first payload further comprises a multi-band proxy address.

14. The non-transitory computer-readable medium of claim 13, wherein the first payload further comprises a multiband sequence number (MBSN) field and a traffic identifier (TID) field.

15. The non-transitory computer-readable medium of claim 14, wherein the ordering of the packet among the plurality of packets in the reordering queue is based at least in part on the MBSN field.

16. The non-transitory computer-readable medium of claim 14, wherein the computer-executable instructions further cause the processor to perform operations comprising:
determining a traffic flow based at least in part on the TID field.

17. The non-transitory computer-readable medium of claim 13, wherein the computer-executable instructions further cause the processor to perform operations comprising:
determining that the access point is using a non-stateless link aggregation method.

18. A method comprising:
identifying a frame received from an access point, wherein the frame comprises a media access control (MAC) header field, a frame check sequence (FCS) field, and a payload field;
causing to buffer the payload field;
determining that a first payload, in a first payload field, corresponds to a multiband link aggregation (MBLA) Ethertype based at least in part on a logical link layer controller (LLC) field and a subnetwork access protocol (SNAP) Ethertype MBLA field in the first payload, wherein the first payload is within the payload field;
causing to remove a LLC MBLA header field from the first payload field;
causing to buffer a packet in a reordering queue, wherein the packet is in a second payload field that is in the first payload field; and
ordering the packet among a plurality of packets in the reordering queue.

19. The method of claim 18, wherein the first payload further comprises a multiband sequence number (MBSN) field and a traffic identifier (TID) field.

20. The method of claim 19, wherein the ordering the packet among the plurality of packets in the reordering queue based at least in part on the MBSN field.

* * * * *